(12) United States Patent
Gewickey et al.

(10) Patent No.: US 7,392,481 B2
(45) Date of Patent: Jun. 24, 2008

(54) METHOD AND APPARATUS FOR PROVIDING CONTENT-OWNER CONTROL IN A NETWORKED DEVICE

(75) Inventors: Greg Gewickey, Silver City, NM (US); Todd Collart, Los Altos, CA (US)

(73) Assignee: Sonic Solutions, a California corporation, Novato, CA (US)

( * ) Notice: Subject to any disclaimer, the term of this patent is extended or adjusted under 35 U.S.C. 154(b) by 792 days.

(21) Appl. No.: 10/190,307

(22) Filed: Jul. 2, 2002

(65) Prior Publication Data

US 2003/0028892 A1      Feb. 6, 2003

Related U.S. Application Data

(60) Provisional application No. 60/302,778, filed on Jul. 2, 2001.

(51) Int. Cl.
  *G06F 3/00* (2006.01)
(52) U.S. Cl. .................. 715/716; 715/738; 715/743; 715/717; 715/501.1; 709/217
(58) Field of Classification Search .......... 715/716, 715/718, 738, 720, 741–743, 500.1, 501.1; 709/217, 219; 725/43, 48, 49, 51, 52, 109, 725/110, 112
See application file for complete search history.

(56) References Cited

U.S. PATENT DOCUMENTS

| 4,672,572 A | 6/1987 | Alsberg ............. 364/900 |
| 4,709,813 A | 12/1987 | Wildt ............. 206/312 |
| 4,710,754 A | 12/1987 | Montean ............. 340/572 |
| 4,739,510 A | 4/1988 | Jeffers et al. ............. 380/15 |

(Continued)

FOREIGN PATENT DOCUMENTS

DE      42 42 992 A1      6/1994

(Continued)

OTHER PUBLICATIONS

U.S. Appl. No. 09/649,215, filed Aug. 28, 2000, Allan Lamkin.

(Continued)

*Primary Examiner*—David A. Wiley
*Assistant Examiner*—Linh Pham
(74) *Attorney, Agent, or Firm*—Fitch, Even, Tabin & Flannery

(57) ABSTRACT

An apparatus and methods for providing content-owner control in a device is optionally networked. A method for accessing media content has steps of initiating a first view providing access to at least a portion of a first content within the first view, initiating a second view providing access to a second content within the second view and preventing the second content from being accessed with the first content in the first view. Additionally, access to a third content with the first content is allowed in the first view. An apparatus includes a first view configured to provide access to a first content, a second view configured to provide access to a second content, and a graphical subsystem configured to prevent the second content from being access in the first view. In one variation, the first view is a media content view, and the second view is a web view.

38 Claims, 8 Drawing Sheets

U.S. PATENT DOCUMENTS

| | | | |
|---|---|---|---|
| 4,785,472 A | 11/1988 | Shapiro | 379/93.19 |
| 4,888,638 A | 12/1989 | Bohn | 358/84 |
| 4,967,185 A | 10/1990 | Montean | 340/572 |
| 4,993,068 A | 2/1991 | Piosenka et al. | 380/23 |
| 5,023,907 A | 6/1991 | Johnson et al. | 380/4 |
| 5,109,482 A | 4/1992 | Bohrman | 395/154 |
| 5,128,752 A | 7/1992 | Von Kohorn | 358/84 |
| 5,274,758 A | 12/1993 | Beitel et al. | 715/500.1 |
| 5,289,439 A | 2/1994 | Koulopoulos et al. | 369/32 |
| 5,305,195 A | 4/1994 | Murphy | 364/401 |
| 5,305,197 A | 4/1994 | Axler et al. | 364/401 |
| 5,347,508 A | 9/1994 | Montbriand et al. | 369/273 |
| 5,353,218 A | 10/1994 | De Lapa et al. | 364/401 |
| 5,400,402 A | 3/1995 | Garfinkle | 380/20 |
| 5,410,343 A | 4/1995 | Coddington et al. | 348/7 |
| 5,413,383 A | 5/1995 | Laurash et al. | 283/79 |
| 5,420,403 A | 5/1995 | Allum et al. | 235/375 |
| 5,457,746 A | 10/1995 | Dolphin | 380/4 |
| 5,483,658 A | 1/1996 | Grube et al. | 395/800 |
| 5,509,074 A | 4/1996 | Choudhury et al. | 380/23 |
| 5,530,686 A | 6/1996 | Schylander et al. | 369/32 |
| 5,550,577 A | 8/1996 | Verbiest et al. | 348/7 |
| 5,568,275 A | 10/1996 | Norton et al. | 386/52 |
| 5,619,733 A | 4/1997 | Noe et al. | 395/881 |
| 5,640,453 A | 6/1997 | Schuchman et al. | 380/10 |
| 5,640,560 A | 6/1997 | Smith | 395/615 |
| 5,642,171 A | 6/1997 | Baumgartner et al. | 348/515 |
| 5,651,064 A | 7/1997 | Newell | 380/4 |
| 5,659,792 A | 8/1997 | Walmsley | 395/807 |
| 5,673,195 A | 9/1997 | Schwartz et al. | 364/468.22 |
| 5,677,953 A | 10/1997 | Dolphin | 380/4 |
| 5,694,546 A | 12/1997 | Reisman | 395/200.9 |
| 5,696,898 A | 12/1997 | Baker et al. | 395/187.01 |
| 5,717,879 A | 2/1998 | Moran et al. | 395/339 |
| 5,729,687 A | 3/1998 | Rothrock et al. | 709/204 |
| 5,734,719 A | 3/1998 | Tsevdos et al. | 380/5 |
| 5,734,898 A | 3/1998 | He | 395/619 |
| 5,736,977 A | 4/1998 | Hughes | 345/326 |
| 5,751,672 A | 5/1998 | Yankowski | 369/30 |
| RE35,839 E | 7/1998 | Asai et al. | 380/3 |
| 5,790,753 A | 8/1998 | Krishnamoorthy | 395/200.33 |
| 5,801,685 A | 9/1998 | Miller et al. | 345/302 |
| 5,802,294 A | 9/1998 | Ludwig et al. | 395/200.34 |
| 5,804,810 A | 9/1998 | Woolley et al. | 235/492 |
| 5,805,442 A | 9/1998 | Crater et al. | 364/138 |
| 5,808,662 A | 9/1998 | Kinney et al. | 348/15 |
| 5,809,250 A | 9/1998 | Kisor | 709/227 |
| 5,809,471 A | 9/1998 | Brodsky | 704/275 |
| 5,812,661 A | 9/1998 | Akiyama et al. | 380/4 |
| 5,819,284 A | 10/1998 | Farber | 707/104 |
| 5,822,123 A | 10/1998 | Davis et al. | 348/564 |
| 5,822,291 A | 10/1998 | Brindze et al. | 369/94 |
| 5,825,876 A | 10/1998 | Peterson, Jr. | 380/4 |
| 5,850,218 A | 12/1998 | LaJolie et al. | 725/45 |
| 5,857,021 A | 1/1999 | Kataoka et al. | 380/4 |
| 5,860,068 A | 1/1999 | Cook | 705/26 |
| 5,869,819 A | 2/1999 | Knowles et al. | 235/375 |
| 5,872,747 A | 2/1999 | Johnson | 369/30 |
| 5,875,296 A | 2/1999 | Shi et al. | 395/188.01 |
| 5,878,020 A | 3/1999 | Takahashi | 369/275.3 |
| 5,878,233 A | 3/1999 | Schloss | 395/200.55 |
| 5,882,291 A | 3/1999 | Bradshaw et al. | 600/3 |
| 5,883,623 A | 3/1999 | Cseri | 345/335 |
| 5,887,143 A | 3/1999 | Saito et al. | 395/200.78 |
| 5,889,980 A | 3/1999 | Smith, Jr. | 395/563 |
| 5,892,825 A | 4/1999 | Mages et al. | 380/3 |
| 5,892,900 A | 4/1999 | Ginter et al. | 395/186 |
| 5,892,908 A | 4/1999 | Hughes et al. | 395/200.8 |
| 5,893,910 A | 4/1999 | Martineau et al. | 707/10 |
| 5,895,073 A | 4/1999 | Moore | 283/70 |
| 5,896,132 A | 4/1999 | Berstis et al. | 345/341 |
| 5,899,980 A | 5/1999 | Wilf et al. | 705/26 |
| 5,907,322 A | 5/1999 | Kelly et al. | 345/327 |
| 5,907,704 A | 5/1999 | Gudmundson et al. | 717/100 |
| 5,909,551 A | 6/1999 | Tahara et al. | 395/200.61 |
| 5,913,210 A | 6/1999 | Call | 707/4 |
| 5,915,093 A | 6/1999 | Berlin et al. | 395/200.49 |
| 5,920,694 A | 7/1999 | Carleton et al. | 395/200.35 |
| 5,922,045 A | 7/1999 | Hanson | 709/206 |
| 5,924,013 A | 7/1999 | Guido et al. | 455/3.1 |
| 5,930,238 A | 7/1999 | Nguyen | 370/260 |
| 5,930,767 A | 7/1999 | Reber et al. | 705/26 |
| 5,931,906 A | 8/1999 | Fidelibus et al. | 709/217 |
| 5,933,497 A | 8/1999 | Beetcher et al. | 380/4 |
| 5,940,504 A | 8/1999 | Griswold | 380/4 |
| 5,943,304 A | 8/1999 | Kamada et al. | 369/34 |
| 5,950,173 A | 9/1999 | Perkowski | 705/26 |
| 5,956,482 A | 9/1999 | Agraharam et al. | 395/200.33 |
| 5,960,398 A | 9/1999 | Fuchigami et al. | 704/270 |
| 5,969,898 A | 10/1999 | Hansen et al. | 360/77.16 |
| 5,978,773 A | 11/1999 | Hudetz et al. | 705/23 |
| 5,986,690 A | 11/1999 | Hendricks | 348/7 |
| 5,987,454 A | 11/1999 | Hobbs | 707/4 |
| 5,987,525 A | 11/1999 | Roberts et al. | 709/248 |
| 5,991,374 A | 11/1999 | Hazenfield | 379/101.01 |
| 5,991,399 A | 11/1999 | Graunke et al. | 380/4 |
| 5,991,798 A | 11/1999 | Ozaki et al. | 709/217 |
| 5,995,965 A | 11/1999 | Experton | 707/10 |
| 6,006,328 A | 12/1999 | Drake | 713/200 |
| 6,009,410 A | 12/1999 | LeMole et al. | 705/14 |
| 6,012,071 A | 1/2000 | Krishna et al. | 707/522 |
| 6,016,166 A | 1/2000 | Huang et al. | 348/515 |
| 6,018,768 A | 1/2000 | Ullman et al. | 709/218 |
| 6,021,307 A | 2/2000 | Chan | 455/3.1 |
| 6,034,937 A | 3/2000 | Kumagai | 369/59 |
| 6,035,329 A | 3/2000 | Mages et al. | 709/217 |
| 6,044,403 A | 3/2000 | Gerszberg et al. | 709/225 |
| 6,047,292 A | 4/2000 | Kelly et al. | 707/104 |
| 6,052,717 A | 4/2000 | Reynolds | 709/218 |
| 6,052,785 A | 4/2000 | Lin et al. | 713/201 |
| 6,055,314 A | 4/2000 | Spies et al. | 380/21 |
| 6,061,057 A | 5/2000 | Knowlton et al. | 345/335 |
| 6,064,979 A | 5/2000 | Perkowski | 705/26 |
| 6,073,124 A | 6/2000 | Krishnan et al. | 705/59 |
| 6,076,733 A | 6/2000 | Wilz, Sr. et al. | 235/462.01 |
| 6,078,348 A | 6/2000 | Klosterman et al. | 348/10 |
| 6,080,207 A | 6/2000 | Kroening et al. | 717/11 |
| 6,081,785 A | 6/2000 | Oshima et al. | 705/1 |
| 6,083,276 A | 7/2000 | Davidson et al. | 717/107 |
| 6,097,291 A | 8/2000 | Tsai et al. | 340/372.6 |
| 6,097,814 A | 8/2000 | Mochizuki | 380/44 |
| 6,101,180 A | 8/2000 | Donahue et al. | 370/352 |
| 6,101,534 A | 8/2000 | Rothschild | 709/217 |
| 6,108,002 A | 8/2000 | Ishizaki | 345/327 |
| 6,108,687 A | 8/2000 | Craig | 709/203 |
| 6,119,147 A | 9/2000 | Toomey et al. | 709/204 |
| 6,124,854 A | 9/2000 | Sartain et al. | 345/327 |
| 6,125,388 A | 9/2000 | Reisman | 709/218 |
| 6,128,649 A | 10/2000 | Smith et al. | 709/217 |
| 6,128,652 A | 10/2000 | Toh et al. | 709/219 |
| 6,134,533 A | 10/2000 | Shell | 705/26 |
| 6,134,593 A | 10/2000 | Alexander et al. | 709/229 |
| 6,138,150 A | 10/2000 | Nichols et al. | 709/219 |
| 6,141,010 A | 10/2000 | Hoyle | 345/336 |
| 6,145,006 A | 11/2000 | Vishlitsky et al. | 709/229 |
| 6,154,738 A | 11/2000 | Call | 707/4 |
| 6,154,773 A | 11/2000 | Roberts et al. | 709/209 |
| 6,154,844 A | 11/2000 | Touboul et al. | 713/201 |
| 6,157,953 A | 12/2000 | Chang | 709/225 |
| 6,161,132 A | 12/2000 | Roberts et al. | 709/219 |
| 6,175,842 B1 | 1/2001 | Kirk et al. | 707/513 |
| 6,175,872 B1 | 1/2001 | Neumann et al. | 709/231 |
| 6,182,222 B1 | 1/2001 | Oparaji | 713/200 |
| 6,184,877 B1 | 2/2001 | Dodson et al. | 725/110 |

| | | | | | | | |
|---|---|---|---|---|---|---|---|
| 6,189,032 B1 | 2/2001 | Susaki et al. | 709/225 | 6,769,130 B1 | 7/2004 | Getsin | 725/89 |
| 6,192,340 B1 | 2/2001 | Abecassis | 704/270 | 6,771,290 B1 | 8/2004 | Hoyle | 345/745 |
| 6,195,693 B1 | 2/2001 | Berry et al. | 709/219 | 6,865,746 B1 | 3/2005 | Herrington et al. | 725/53 |
| 6,199,048 B1 | 3/2001 | Hudetz et al. | 705/23 | 6,868,225 B1 | 3/2005 | Brown et al. | 386/83 |
| 6,208,805 B1 | 3/2001 | Abecassis | 386/126 | 6,941,383 B1 | 9/2005 | Getsin et al. | 709/248 |
| 6,219,675 B1 | 4/2001 | Pal et al. | 707/201 | 6,944,621 B1 | 9/2005 | Collart | 707/102 |
| 6,226,235 B1 | 5/2001 | Wehmeyer | 369/30 | 6,952,697 B1 | 10/2005 | Rothschild | 707/9 |
| 6,229,523 B1 | 5/2001 | Czako | 345/150 | 7,043,693 B2 | 5/2006 | Wenzel et al. | 715/763 |
| 6,230,174 B1 | 5/2001 | Berger et al. | 707/513 | 7,062,777 B2 | 6/2006 | Alba et al. | 725/39 |
| 6,230,324 B1 | 5/2001 | Tomita et al. | 725/51 | 7,165,071 B2 | 1/2007 | Fanning et al. | 707/10 |
| 6,233,618 B1 | 5/2001 | Shannon | 709/229 | 7,165,098 B1 | 1/2007 | Boyer et al. | 709/219 |
| 6,233,736 B1 | 5/2001 | Wolzien | 725/110 | 2001/0001160 A1 | 5/2001 | Shoff | 725/51 |
| 6,239,793 B1 | 5/2001 | Barnert et al. | 345/302 | 2001/0005903 A1 | 6/2001 | Goldschmidt Iki et al. | 725/50 |
| 6,239,801 B1 | 5/2001 | Chiu et al. | 345/349 | 2001/0056478 A1 | 12/2001 | Wheeler et al. | 709/219 |
| 6,240,459 B1 | 5/2001 | Roberts et al. | 709/232 | 2002/0026321 A1 | 2/2002 | Faris et al. | 705/1 |
| 6,240,555 B1 | 5/2001 | Shoff et al. | 725/110 | 2002/0056129 A1 | 5/2002 | Blackketter et al. | 725/112 |
| 6,243,692 B1 | 6/2001 | Floyd et al. | 705/59 | 2002/0057893 A1 | 5/2002 | Wood et al. | 386/46 |
| 6,246,778 B1 | 6/2001 | Moore | 382/103 | 2002/0073152 A1 | 6/2002 | Andrew et al. | 709/204 |
| 6,259,701 B1 | 7/2001 | Shur et al. | 370/401 | 2002/0078144 A1 | 6/2002 | Lamkin et al. | 709/203 |
| 6,263,501 B1 | 7/2001 | Schein et al. | 725/39 | 2002/0083377 A1 | 6/2002 | Clauss et al. | 714/57 |
| 6,263,505 B1 | 7/2001 | Walker et al. | 725/110 | 2002/0088011 A1 | 7/2002 | Lamkin et al. | 725/142 |
| 6,282,713 B1 | 8/2001 | Kitsukawa et al. | 725/36 | 2002/0103855 A1 | 8/2002 | Chantani | |
| 6,289,165 B1 | 9/2001 | Abecassis | 386/46 | 2002/0143774 A1 | 10/2002 | Vandersluis | 707/10 |
| 6,298,482 B1 | 10/2001 | Seidman et al. | 725/101 | 2002/0184627 A1 | 12/2002 | Alba et al. | 725/39 |
| 6,301,661 B1 | 10/2001 | Shambroom | 713/168 | 2003/0005461 A1 | 1/2003 | Shinohara | 725/110 |
| 6,308,005 B1 | 10/2001 | Ando et al. | 386/95 | 2003/0101232 A1 | 5/2003 | Ullman et al. | 709/217 |
| 6,321,252 B1 | 11/2001 | Bhola et al. | 709/204 | 2003/0204847 A1 | 10/2003 | Ellis et al. | 725/42 |
| 6,331,865 B1 | 12/2001 | Sachs et al. | 345/776 | 2004/0024889 A1 | 2/2004 | Getsin et al. | 709/229 |
| 6,341,375 B1 | 1/2002 | Watkins | 725/100 | 2004/0040042 A1 | 2/2004 | Feinleib | 725/112 |
| 6,360,057 B1 | 3/2002 | Tsumagari et al. | 386/95 | 2004/0220791 A1 | 11/2004 | Lamkin | 703/11 |
| 6,374,402 B1 | 4/2002 | Schmeidler et al. | 717/11 | 2004/0220926 A1 | 11/2004 | Lamkin | 707/3 |
| 6,381,404 B1 | 4/2002 | deCarmo | 386/125 | 2004/0244041 A1 | 12/2004 | Collart | 725/89 |
| 6,388,714 B1 | 5/2002 | Schein et al. | 348/563 | 2004/0255236 A1 | 12/2004 | Getsin | 715/500.1 |
| 6,389,467 B1 | 5/2002 | Eyal | 709/223 | 2005/0041150 A1 | 2/2005 | Gewickey | 348/565 |
| 6,389,473 B1 | 5/2002 | Carmel et al. | 709/231 | 2005/0044481 A1 | 2/2005 | Collart | 715/500.1 |
| 6,415,438 B1 | 7/2002 | Blackketter et al. | 725/136 | 2005/0166232 A1 | 7/2005 | Lamkin | 725/43 |
| 6,418,471 B1 | 7/2002 | Shelton et al. | 709/227 | 2005/0182825 A1 | 8/2005 | Lamkin | 709/219 |
| 6,449,653 B2 | 9/2002 | Klemets et al. | 709/231 | 2005/0193322 A1 | 9/2005 | Lamkin | 715/500.1 |
| 6,453,420 B1 | 9/2002 | Collart | 713/201 | 2005/0198574 A1 | 9/2005 | Lamkin | 715/719 |
| 6,453,459 B1 | 9/2002 | Brodersen et al. | 717/100 | 2005/0251732 A1 | 11/2005 | Lamkin | 715/500.1 |
| 6,460,086 B1 | 10/2002 | Swaminathan et al. | 709/236 | 2005/0251749 A1 | 11/2005 | Lamkin | 715/719 |
| 6,460,180 B1 | 10/2002 | Park et al. | 725/40 | 2005/0265701 A1 | 12/2005 | Lamkin et al. | 386/125 |
| 6,462,754 B1 | 10/2002 | Chakraborty et al. | 715/723 | 2005/0278435 A1 | 12/2005 | Lamkin et al. | 709/219 |
| 6,463,468 B1 | 10/2002 | Buch et al. | 709/219 | 2005/0278729 A1 | 12/2005 | Lamkin et al. | 719/328 |
| 6,486,891 B1 | 11/2002 | Rice | 715/738 | 2006/0004778 A1 | 1/2006 | Lamkin et al. | 707/10 |
| 6,499,057 B1 | 12/2002 | Portuesi | 709/217 | 2006/0041639 A1 | 2/2006 | Lamkin | 709/219 |
| 6,505,160 B1 | 1/2003 | Levy et al. | 704/270 | 2006/0041640 A1 | 2/2006 | Lamkin | 709/219 |
| 6,505,169 B1 | 1/2003 | Bhagavath et al. | 705/14 | 2006/0107215 A1 | 5/2006 | Gewickey | 715/716 |
| 6,510,467 B1 | 1/2003 | Behfar et al. | 709/233 | 2006/0112336 A1 | 5/2006 | Gewickey | 715/716 |
| 6,516,467 B1 | 2/2003 | Schindler et al. | 725/153 | 2006/0117344 A1 | 6/2006 | Lamkin | 725/38 |
| 6,523,063 B1 | 2/2003 | Miller et al. | 709/229 | 2006/0159109 A1 | 7/2006 | Lamkin | 370/401 |
| 6,526,580 B2 | 2/2003 | Shimomura | 725/63 | 2006/0161635 A1 | 7/2006 | Lamkin | 709/217 |
| 6,529,949 B1 | 3/2003 | Getsin et al. | 709/217 | 2006/0181965 A1 | 8/2006 | Collart | 369/30.01 |
| 6,535,909 B1 | 3/2003 | Rust | 709/204 | 2006/0182424 A1 | 8/2006 | Lamkin | 386/112 |
| 6,543,053 B1 | 4/2003 | Li et al. | 725/88 | 2006/0193606 A1 | 8/2006 | Lamkin | 386/95 |
| 6,564,255 B1 | 5/2003 | Mobini et al. | 709/219 | 2006/0195600 A1 | 8/2006 | Getsin | 709/231 |
| 6,567,980 B1 | 5/2003 | Jain et al. | 725/61 | | | | |
| 6,573,907 B1 | 6/2003 | Madrane | 715/719 | | | | |

FOREIGN PATENT DOCUMENTS

| | | |
|---|---|---|
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 | 3/1998 |
| JP | 11039262 A | 2/1999 |
| WO | WO98/47080 | 10/1998 |
| WO | WO98/58368 | 12/1998 |

| | | | | |
|---|---|---|---|---|
| 6,580,870 B1 | 6/2003 | Kanazawa et al. | 386/95 | |
| 6,591,420 B1 | 7/2003 | McPherson et al. | 725/29 | |
| 6,601,103 B1 | 7/2003 | Goldschmidt et al. | 709/231 | |
| 6,609,253 B1 | 8/2003 | Swix et al. | 725/88 | |
| 6,615,408 B1 | 9/2003 | Kaiser et al. | 725/112 | |
| 6,625,656 B2 | 9/2003 | Goldhor et al. | 709/231 | |
| 6,636,888 B1 | 10/2003 | Bookspan et al. | 709/203 | |
| 6,640,337 B1 | 10/2003 | Lu | 725/39 | |
| 6,659,861 B1 | 12/2003 | Faris et al. | 463/1 | |
| 6,691,106 B1 | 2/2004 | Sathyanarayan | 707/3 | |
| 6,691,126 B1 | 2/2004 | Syeda-Mahmood | 707/102 | |
| 6,694,309 B2 | 2/2004 | Cho et al. | 707/3 | |
| 6,698,020 B1 | 2/2004 | Zigmond et al. | 725/34 | |
| 6,725,281 B1 | 4/2004 | Zintel et al. | 709/318 | |
| 6,760,043 B2 | 7/2004 | Markel | 715/717 | |

| | | |
|---|---|---|
| WO | WO99/14678 | 3/1999 |
| WO | WO99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

U.S. Appl. No. 09/476,190, filed Jan. 3, 2000, Todd R. Collart.
U.S. Appl. No. 09/488,345, filed Jan. 20, 2000, Todd R. Collart.
U.S. Appl. No. 09/488,337, filed Jan. 20, 2000, Evgeniy Getsin.
U.S. Appl. No. 09/488,613, filed Jan. 20, 2000, Evgeniy Getsin.
U.S. Appl. No. 09/488,155, filed Jan. 20, 2000, Evgeniy Getsin.
U.S. Appl. No. 09/489,597, filed Jan. 20, 2000, Evgeniy Getsin.
U.S. Appl. No. 09/489,600, filed Jan. 20, 2000, Evgeniy Getsin.
U.S. Appl. No. 09/488,614, filed Jan. 20, 2000, Evgeniy Getsin.
U.S. Appl. No. 09/489,596, filed Jan. 20, 2000, Todd R. Collart.
U.S. Appl. No. 09/489,601, filed Jan. 20, 2000, Evgeniy Getsin.
U.S. Appl. No. 10/860,351, filed Jun. 2, 2004, Allan Lamkin.
U.S. Appl. No. 10/860,350, filed Jun. 2, 2004, Allan Lamkin.
U.S. Appl. No. 10/877,644, filed Jun. 25, 2004, Allan Lamkin.
U.S. Appl. No. 10/880,272, filed Jun. 28, 2004, Allan Lamkin.
E Media Professional Reviews, NSM Galaxy Jukebox, by David Doering, Emedia Professional, Apr. 1999, (p. 78-80), http://www.emediapeo.com/EM1999/doering4.html.
"Interactive Education: Transitioning CD-ROMs to the Web", by Michael Mascha and Gary Seaman, Department of Anthropology, University of Southern California, Los Angeles, California, USA, Computer NEtworks and ISDN Systems 27 (1994) 267-272.
"Active Video Watching Using Annotation," by Nuno Correia and Teresa Chambel, ACM Digital Library, International Multimedia Conference, Oct. 30-Nov. 5, 1999, in Orlando, Florida.
"No Modem Needed: TV Signals Bring the Web to Your PC," by Michael S. Lasky, Computing Storypage, CNN IDG.net, May 19, 1998.
"All About DIVX, Where the Facts are Told and the Decision is Yours!" Webmaster's Note Jan, 26, 1999, http://www.prodivx.com.
Advanced Television Enhancement Forum Specification (ATVEF), Comment Draft Version 1.0r1, 1-20 copy of printout from web site Http://www.atvef.com/atef_spec/TVE-public.htm (Oct. 18, 1998).
MBONE Multicasting Tomorrow's Internet, Request for Comments (RFC) 1112 and 1458, Appendices A and B, Copyright 1996, 1998.
Abstract of "MBONE Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net/gaztec/gaztec15.htm, posted Sep. 7, 1998, vol. II, No. 13.
"When Signed, Sealed, Delivered, It's Yours," by Precision Marketing, p. 30(1), Jul. 21, 1997.
http://www.spinware.net/portanet/portanet.html, printed on Jan. 8, 2003.
Henry M. Gladney, "Safeguarding Digital Library Contents and Users: Document Access Control," Dlib Magazine, http://www.dlib.org/dlib/june97/ibm/06gladdney.html, Jun. 1997.
"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.
"CyberMedia Secures Major Licensing Agreement With Sony for Oil Change Software," http://www.cypbermedia.com/company/pr/sony.html, Nov. 26, 2001.
MarketScape's WebCD Pro Publisher, Ron Gustavson, Emedia Professional, Dec. 1997, http://www.emedialive.com/awards/award11.html.
"Hybrid CD-ROM/Online Titles Will Surge in 1996," DCD Business, Apr. 1996, http://www.tapediscbusiness.com/issues/1996/0496/apr_index.html.
PC Magazine, "Trends Online: Intel's Internet Plans: Hybrid Applications", Jul. 24, 1996.
"MarketScape(R) WebCD(TM) 1.0 Bypasses Internet Bottlenecks," DialogWeb, Aug. 26, 1996.
"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.
"CD-ROM/Online Hybrids, The Missing Link?", by Richard R. Reisman, CD-ROM Professional, vol. 8, No. 4, Apr. 1995, http://www.teleshuttle.com/cdpart.htm.
Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss/netstuff.html.
"Oil Change software hunts down upgrades," by Barry Cooper, The Orlando Sentinel, Web-Posted Oct. 30, 1996, The Augusta Chronicle Online, http://www.augustachronicle.com/headlines/103196/oil_change.html.
Player 2.0 Product Description, Copyright 1995-2000, InterActual Technologies.
"Topic is Veritably Everywhere: CD-ROM, the Web, Intranets, etc.," Seybold Report on Desktop Publishing, vol. 10, No. 7, Copyright 1996 by Seybold Publications, Inc.
"Spin Webs around a CD-ROM: The Next Generation of CD/Web Hybrids," Richard R. Reisman, President, Teleshuttle Corporation, Mass High Tech, Sep. 2, 1996, http://www.teleshuttle.com/nextgen.htm.
"Update Your Software While You Sleep," Edited by Paul. M. Eng, Bits & Bytes, BusinessWeek, Upadated Jun. 17, 1996, http://www.businessweek.com/1996/25/b3480140.htm.
"Verity smooths Net searches," by CNET News.com Staff, Tech News—CNET.com, Feb. 20, 1996.
"Video and Audio: Organization and Retrieval in the WWW", White Paper. (1996) http://vosaic.com/corp/papers/www.5.html. Http://citeseer.nj.nec.com/chen96video.html.
"Web/CD-ROM hybrids; A working definition," site established Oct. 2, 1998, http://philb.com/webcd.htm.
Who's Who Hybrid Internet/CD-ROM Magazine/Catalog, Google cache Nov. 26, 2001, http://ecatcorp.com/alpha/mci.htm.
WebCD, Internet Posting, Roger Clarke, Dec. 1, 1996, http://www.anu.edu.au/people/Roger.Clarke/II/WebCD.html.
Re: WebCD, Internet Posting, Ron Ipsen, Dec. 1, 1996, http://www.anu.edu.au/mail-archives/link/link9612/0006.html.
Re: WebCD, Internet Posting, George Michaelson, Dec. 1, 1996, http://www.anu.edu.au/mail-archives/link/link9612/0003.html and Dec. 2, 1996, http://www.anu.edu.au/mail-archives/link/link9612/0011.html.
Re: WebCD, Internet Posting, Liddy Nevile, Dec. 2, 1996, http://www.anu.edu.au/mail-archives/link/link9612/0010.html.
Re: WebCD, Internet Posting, Rachel Polanskis, Dec. 2, 1996, http://www.anu.edu.au/mail-archives/link/link9612/0013.html.
www.techdirect.com/articles/20030516/1358202.shtml, May 16, 2003.
www.techdirt.com/articles/990616/1020235_F.shtml, Jun. 16, 2003.
"MultiSync: A Synchronization Model for Multimedia Systems," IEEE Journal On Selected Areas in Communications, vol. 14, No. 1, Jan. 1996, Jan. 1996, pp. 238-248.
"World-Wide Web: a distributed paadigm for global hetworking"; Heylighen, F., Proceeding SHARE Europe Spring Conference; pp. 355-368; Apr. 18, 1994.
"A Simplified and an Efficient Packet Level Internet Access Control Scheme"; Igbal, MS, et al.; ICCS/ISITA '92; Singapore; IEEE Publications; 1992; pp. 963-967.
"CDLink", Duguid, Brian; The Wire, Apr. 1996, available at http://www.hyperreal.org/~duguid/wirecdlk/html.
"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.
"Voyager CDLink Turns Audio CDs into CD-ROMs"; Press Release, Voyager Co.; (Jul. 12, 1995), available at http://www.voyagerco.com from Jul. 12, 1995 to 1997.
"Net Surf", Wired Magazine, Issue 4.05 (May 1996), available at http://www.wired.com/wired/archive/4.05/net_surf.html.

"Voyager CDLink (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref.html on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; NEWMEDIA, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, consumer Electronics, 2002, ICCE, 2002 Digest of Technical Papers, International Conference on Jun. 18-20, 2002, pp. 264-265.

"Software Distribution by CD-ROM Linked with Network," IBM Technical Disclosure Bulletin, vol. 38, No. 11, Nov. 1, 1995, pp. 111-112.

Abstract of Edgar Weippl's, "An Approach to Role-Based Access Control for Digital Content," 2001, IEEE, pp. 290-294.

"Internet tool triggers audio CDs," by Cate C. Corcoran, Jul. 24, 1995, http://www.access.ch/power/infoservices/MacWeek/MacWeek240795.html.

Resource Guide on Distributed Media: Local/CD-ROM/Online/Web, updated Nov. 25, 1996, Richard R. Reisman, President, Teleshuttle, http://www.teleshuttle.com/resource.

"A Beginners Guide to URL's", available at http://archive.ncsa.uiuc.edu/demoweb/url-primer.html, printed on Mar. 17, 2004.

"Naming and Addressing: URIs, URLs, . . . " available at http://www.w3.org/Addressing/, printed on Mar. 17, 2004.

Adams et al. "Distributed Research Teams: Meeting Asynchronously in Virtual Spate" FX Palo Alto Laboratory, Inc. JCMC Jun. 1999.

Manohar et al. "Replay by Re-execution: a Paradigm for Asynchronous Collaboration via Record and Replay of Interactive Multimedia Sessions" SIGOIS Bulletin, Dec. 1994.

Minneman et al. "A Confederation of Tools for Capturing and Accessing Collaborative Activity" ACM Multimedia 95—Electronic Proceedings Nov. 1995.

Office Action from 09295856 dated Mar. 23, 2000 (68590).
Office Action from 09295856 dated Apr. 9, 2001 (68590).
Office Action from 09295856 dated Nov. 9, 2001 (68590).
Office Action from 09295856 dated Dec. 11, 2000 (68590).
Office Action from 09295202 dated Nov. 1, 2001 (68610).
Office Action from 09295964 dated Jun. 6, 2001 (68613).
Office Action from 09295964 dated Dec. 22, 2000 (68613).
Advisory Action from 09489596 dated Dec. 12, 2005 (68626).
Advisory Action form 09489596 dated Dec. 27, 2006 (68626).
Office Action from 09489596 dated Feb. 11, 2004 (68626).
Office Action from 09489596 dated Jun. 14, 2006 (68626).
Office Action from 09489596 dated Jun. 30, 2005 (68626).
Office Action from 09489596 dated Jul. 8, 2003 (68626).
Office Action from 09489596 dated Aug. 2, 2004 (68626).
Office Action from 09489596 dated Sep. 13, 2006 (68626).
Office Action from 09489596 dated Oct. 3, 2002 (68626).
Office Action from 09489596 dated Dec. 14, 2004 (68626).
Office Action from 09489596 dated Dec. 29, 2005 (68626).
Office Action from 11154092 dated May 14, 2007 (86601).

METHOD AND APPARATUS FOR PROVIDING CONTENT-OWNER CONTROL IN A NETWORKED DEVICE

CROSS-REFERENCE TO RELATED APPLICATION

This application claims priority under 35 U.S.C. 119(e) to U.S. Provisional Patent Application No. 60/302,778, filed Jul. 2, 2001, of Gewickey et al., for A SYSTEM FOR PROVIDING CONTENT-OWNER CONTROL OF PLAYBACK IN A NETWORKED DEVICE, which U.S. Provisional Patent Application is hereby fully incorporated herein by reference.

BACKGROUND

1. Field of the Invention

The present invention relates generally to the presentation of multimedia content, and more specifically to the presentation of media content combined with enhanced, interactively-obtained media content.

2. Discussion of the Related Art

The World Wide Web or the Internet, through which the World Wide Web is enabled, provides companies with immense resources to market their produces and educate potential customers about their products. Further, the Internet allows companies to easily and quickly update information to ensure the information accessed by individuals is the most current and up to date.

Other media, such as VHS videos, compact discs (CD), digital video discs (DVD) and other similar media do not provide the same, up to date information. Once these media are produced and distributed, the content provided is restricted to what was released. As such, companies selling content contained on these types of media (e.g., movies on DVDs and music on CDs) cannot maintain the content current. The distribution of broadcast or video on demand (VOD) streams similarly cannot maintain the content as current. Typically, the assets for the streams (broadcast or VOD) are provided to a third party for broadcast, at which point, the content owner no longer has control over the content. As such, the release of fixed and/or streamed media content results in the user or consumer receiving dated content.

As such, companies producing and distributing content on such fixed and/or streamed media cannot provide customers with the most current content Further, these companies lose out on opportunities to market additional, newly produced content through these fixed content media.

SUMMARY OF THE EMBODIMENT

The present embodiment advantageously addresses the needs above as well as other needs by providing an apparatus and method for accessing media content. The method and apparatus, in one variation, initiate a first view providing access to at least a portion of a first content within the first view. A second view is initiated providing access to a second content within the second view. However, the present method and apparatus prevent the second content from being accessed with the first content in the first view. Further, access to a third content with the first content is allowed in the first view.

The present embodiment, in another variation, provides an apparatus for accessing content. The apparatus includes a first view configured to provide access to a first content; a second view configured to provide access to a second content; and a graphical subsystem configured to prevent the second content from being access in the first view. In one variation, the first view is a media content view and the first content is media content and the second view is a web view and the second content is Internet content wherein the first view is configured to provide access to a third content, where the third content is authorized to be associated with the first content.

The present embodiment, in a further variation, additionally provides a method for providing access to content. The method includes the steps of receiving a key generated from information extracted from a first content; identifying the first content based on the key; receiving additional information regard the first content; authenticating the first content based on the key and the additional information; and allowing access to a second content, wherein the additional information includes an identifier. In one variation, the method further includes the steps of preventing access to the second content if the first content is not authenticated.

In another further variation, a method for controlling accessing content is providing, which includes the steps of collecting content state information; receiving an input for control over the access to content, where the input defines more than one control operation; determining a first control operation to implement the input based on the content state information; implementing the first control operation when the content is in a first state; determining a second control operation to implement when the content is in a second state; and implementing the second control operation when the content is in the second state.

A method is further provided for controlling access to content, comprising the steps of: receiving an input for control over the access to content, where the input defines more than one control operation; determining which of a plurality of views is currently active; determining a first control operation to implement the input based on the active view; implementing the first control operation when a first view is active; determining a second control operation to implement when a second view is active; and implementing the second control operation when the second view is active.

In yet another variation, the present embodiment provides a method for accessing content, comprising the steps of: providing access to a first content; determining that a second content is associated with the first content; notifying a user that the second content is available; transitioning to the second content if a first selection is received and generating a notification event, wherein the step of notifying is initiated by the notification event.

The present embodiment, in yet an additional variation, further provides an apparatus for accessing content. The apparatus include an event generator is configured to generate a notification event; a notification generator is coupled with the event generator to receive the notification event, wherein the notification generator is configured to generate a notification signal; and a content player coupled with the notification generator to receive the notification signal, wherein the content player is configured to generate a notification.

A method is further provided for accessing content, which includes the steps of: providing access to a first content; extracting information from the first content; identifying the first content; providing access to a second content authorized to be associated with the first content if the first content is identified; and preventing access to the second content if the first content is not identified.

A better understanding of the features and advantages of the present embodiment will be obtained by reference to the following detailed description of the embodiment and accompanying drawings that set forth an illustrative variation in which the principles of the embodiment are utilized.

BRIEF DESCRIPTION OF THE DRAWINGS

The above and other aspects, features and advantages of the present embodiment will be more apparent from the following more particular description thereof, presented in conjunction with the following drawings wherein.

Corresponding reference characters indicate corresponding components throughout the several views of the drawings.

DETAILED DESCRIPTION OF THE EMBODIMENTS

Figure 1:
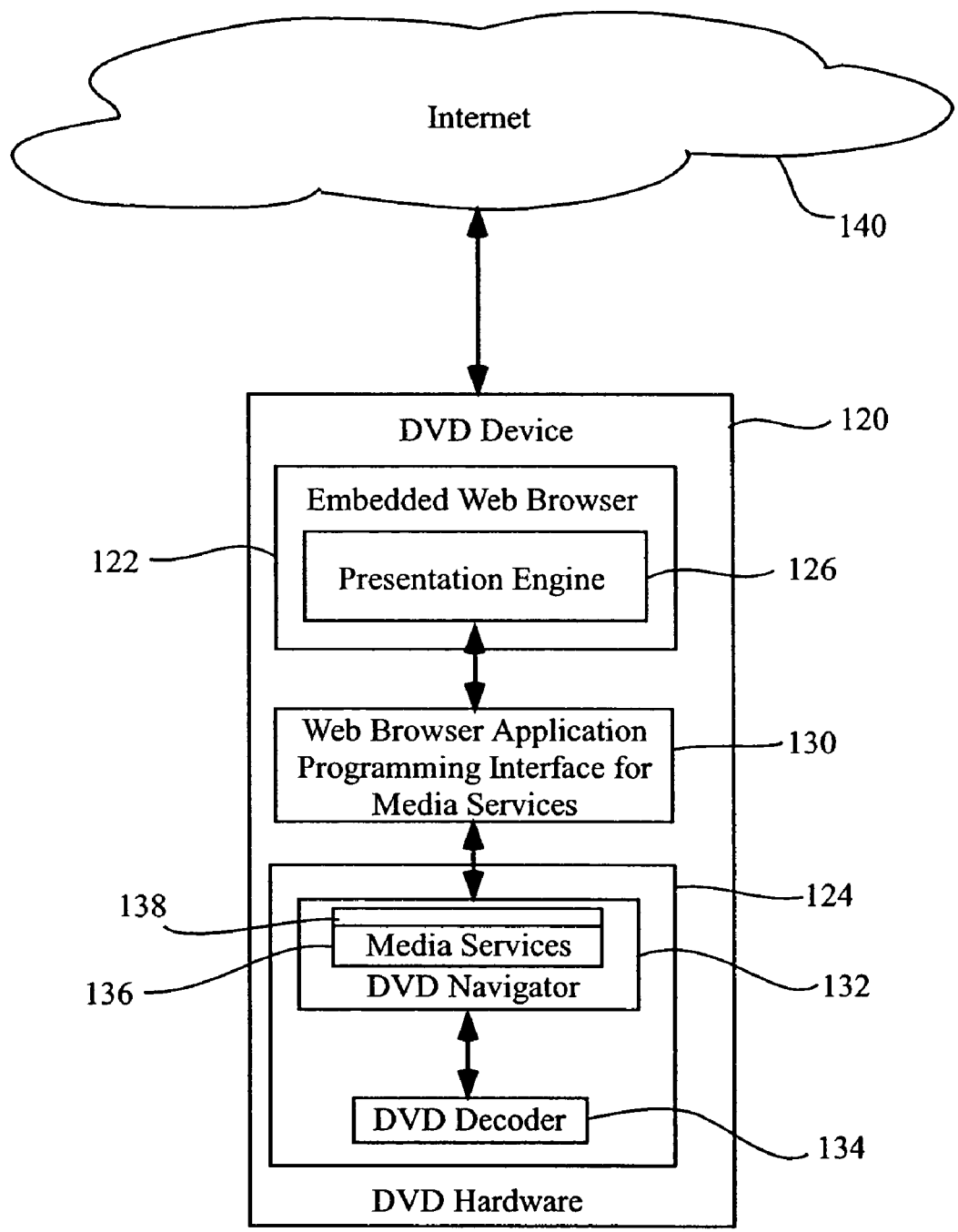
FIG. 1 depicts a simplified block diagram of a media player according to one variation of the present embodiment.

The following description is not to be taken in a limiting sense, but is made merely for the purpose of describing the general principles of the embodiment. The scope of the embodiment should be determined with reference to the claims.

The present embodiment provides a method and apparatus for allowing access to digitally stored content. Further, the present method and apparatus provides access to media content that is locally stored and/or cached, stored on portable storage devices (such as compact discs (CDs), digital video discs (DVDs) and the like), remotely stored, received as broadcasted or streaming content, and the like. Media content can be substantially any type of content including, but not limited to, video content, audio content, data content, and substantially any other type of content. In one variation, the present embodiment additionally allows enhanced, revised and/or new media content to be used in cooperation with existing content and/or to replace some or all of existing content. The enhanced content also can be locally stored and/or cached, stored on portable storage devices (such as compact discs (CDs), digital video discs (DVDs) and the like), remotely stored, received as broadcasted or streaming content, and the like.

Typically, a remote storage is accessed through a network, such as the Internet, an internal office network or other similar networks. As such, the remote storage can be substantially any remote storage device. In one variation, the present embodiment is networked, for example networked with the Internet and thus web-enabled, to allow access to the Internet and substantially any Internet site and remote servers.

In allowing access to media content, the media content owners want to maintain control of the property rights of their media content. Media content owners are concerned about how their properties are accessed (e.g., played) and what data can be associated with their properties for essentially the entire content lifecycle. Content can not be considered as just the core video asset and/or audio asset. Content includes the core asset(s) plus substantially any integrated or embedded data structures, plus branding and control of the playback of the content, plus when the content can connect with a network (e.g., connect online with the Internet), where it can connect online and what can be accessed, played and/or viewed when it connects online. The present method and apparatus allows users to access media content (local and/or remote content) while allowing the media content owner to maintain control over the property rights, integrated and/or embedded data structures, branding and playback, when and where connections can be made with the Internet, what access can be established over the Internet and other similar controls.

The present embodiment further limits or prevents third parties from gaining access to and knowledge about the content and what content or portion of content is actively being accessed and/or played. As such the present embodiment allows users to access and use local and/or remote media content while allowing the content owners to avoid making the content and its operation publicly available. For example, in the case of a DVD player, the media content owners do not want third parties (whether it be the player manufacturers, online websites, Internet service providers (ISP) and other third parties) to know what section or piece of content is currently being played. As such the present embodiment prevents abuse of the media content that could cause problems for the content company, talent or others involved in the ownership and/or making of the content.

The present method and apparatus is configured to allow a user to gain access to media content, as well as access the network and/or Internet. In one variation, the present method and apparatus allow access to the Internet to supply the media content and/or supplement local media content. However, the present embodiment allows the media content owners to control how, when and/or what additional content is accessed in relation to their media content. For example, a movie production company like New Line Cinema would want to prevent a user viewing a movie owned by New Line to gain access to another movie production company's web site, such as Disney, while viewing the New Line movie. As such, the present embodiment provides New Line with control over what additional and/or enhanced content can be associated and viewed with content owned by New Line.

FIG. 1 depicts a simplified block diagram of a media player 120 according to one embodiment. The media player could be implemented as a DVD player, a CD player, video on demand (VOD) player, a computer, a set-top box, a personal or digital video recorder (PVR or DVR) and substantially any other media player. The media player, its components, its operation and communication are more fully described in U.S. patent application Ser. No. 09/935,756, now U.S. Pat. No. 7,178, 106, entitled PRESENTATION OF MEDIA CONTENT FROM MULTIPLE MEDIA SOURCES, filed on Aug. 21, 2001, which is incorporated herein by reference in its entirety. In the variation shown in FIG. 1, the media player 120 includes both an embedded web browser 122 and media player hardware 124. The embedded web browser 122 includes a presentation engine 126. The embedded web browser is coupled with a web browser application programming interface for media services 130 that, in turn, is coupled with the media player hardware 124. The media player hardware includes a media navigator 132 and a media decoder 134. The media player navigator 132 includes a media services 136 and graphical subsystem 138. The media services are coupled with the media decoder 134. The media player 120 is coupled with a network 140, such as the internet or other network. The media services 136 can be considered as part of a media subsystem. The media subsystem is a superset of the media services 130 and includes a navigator for media content (e.g., DVD disc).

Utilizing the media player 120, a user is able to interact with enhanced content. For example, the media player allows a user to interact with an enhanced DVD on a television in a similar fashion as can be experienced on a computer. The display area of a television can show video and HTML content concurrently. This is accomplished through, in part, the embedded web browser 122 in the media player. In one variation, the HTML content can control the playback of the media content through embedded application programming interface (API) commands.

The embedded web browser 122 can be utilized to display the HTML content authored on enhanced-compatible disks, stored locally on device 120, or served from a remote server location on the network 120. The embedded web browser 122 also can support concurrent playback of video and audio while presenting HTML data and/or page(s).

The presentation engine 126 of the browser provides for the embedding of media content (e.g., a video) within web pages. Embedding media content within web pages define the location where the content is played. This location information is then parsed by the presentation engine and passed to an underlying content and/or image rendering engine.

The presentation engine 126 of the embedded web browser 122 can parse HTML instructions for controlling the media playback, generate graphic portions of the display, position a video window when it exists, interface directly with the underlying media navigator 132 and other similar functions. Enhanced-specific instructions are interpreted by the presentation engine 126 and passed to a media player abstraction layer, which can be part of the embedded browser or developed by the media navigator manufacturer. This abstraction layer serves as an abstraction that makes it possible to map the browser into a media player-specific media navigator developed either by the semiconductor manufacturer or the player manufacturer. The media navigator additionally interfaces with underlying video and audio decoders.

The web browser application programming interface for media services 130 (or media navigator abstraction layer) is an interface layer between the presentation engine 126 and the media services 136. The media navigator abstraction layer 130 may be developed by the player manufacturer or the semiconductor manufacturer. To support a flexible and portable solution, the media navigator abstraction layer 130 is recommended to reside in between the browser 122 and the media navigator 132. Abstracting the communication between the browser 122 and navigator 132 offers a more robust and portable design, so that either the browser or the navigator can be changed in future player designs.

The media navigator 132 controls the decoding and playback of media in the drive. The media services 136 serves as a middleware layer between web browser application programming interface for media services 130 and the media navigator 132. The media services 136 facilitates content running in the web browser 122 to control the media navigator. The media services 136 allow the media navigator to work with substantially any web browser compliant with the present variation.

The media decoder 134 interfaces between the media interface hardware contained in the hardware 124 and the media navigator 132. The network and/or Internet 140 is shown as a specific example of the offsite content source.

Figure 2:
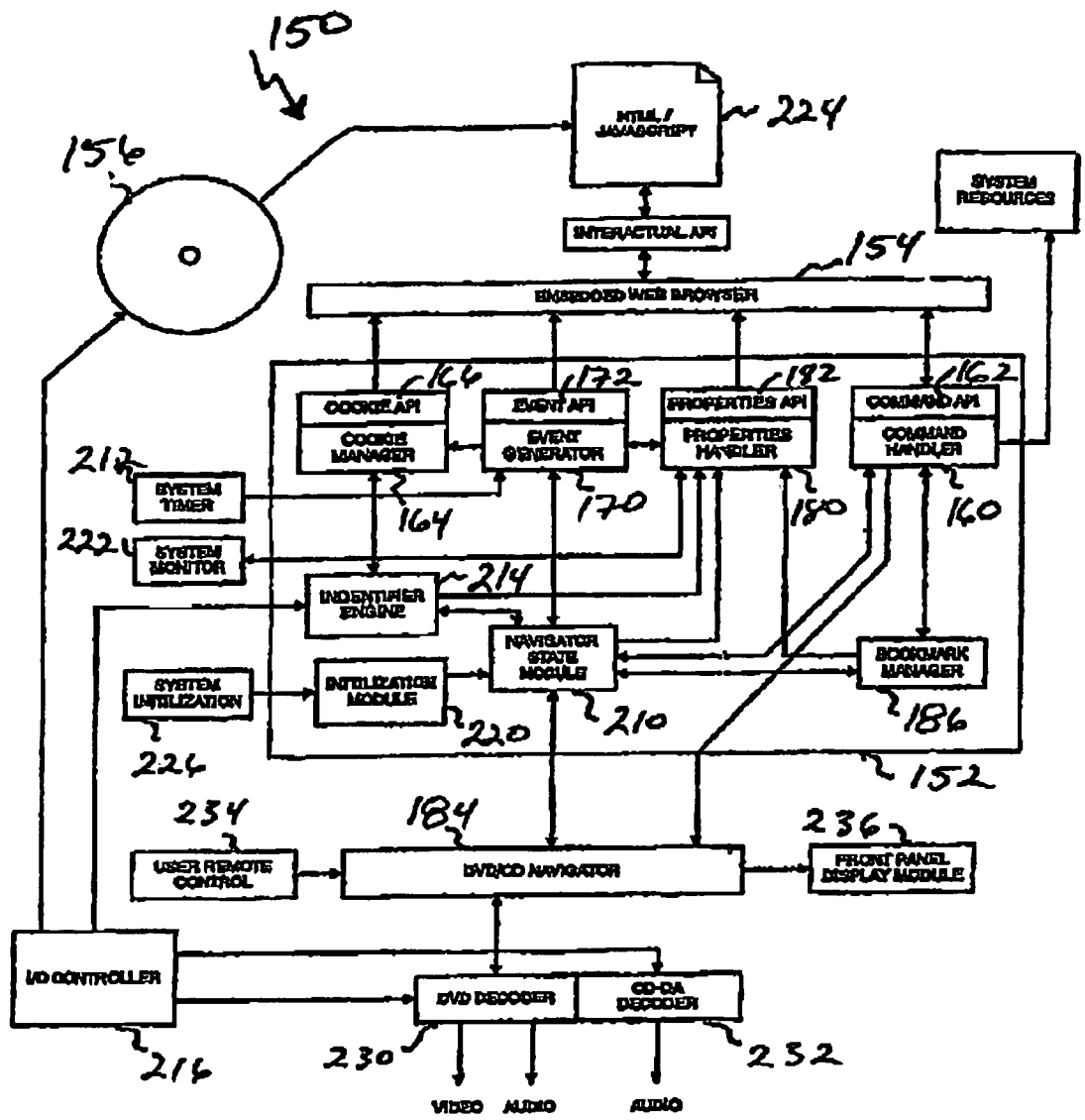
FIG. 2 shows a simplified block diagram of the web browser application programming interface for media services of FIG. 1 according to one variation of the present embodiment.

FIG. 2 shows a simplified block diagram of the web browser application programming interface 150 for media services 130 of FIG. 1 according to one embodiment. In operation, the embedded web browser 154 receives HTML and/or JavaScript media content (for example, from a local or portable storage disk 156) which is displayed by presentation engine 126 (see FIG. 1). The embedded web browser 154 originates commands (as a result of user interaction which can be achieved through a remote in set-top systems, the keyboard or mouse in computing systems, the game interface in gaming systems, and the like), which are sent to the command handler 160 by way of the command API 162. The embedded web browser 154 also receives commands from the command handler by way of the command API. An example of such a command is Enhance.FullScreen(w) where media content is displayed on the full display screen. The embedded web browser 154 also receives cookies from the cookie manager 164 through the cookie API 166, generally in response to the accessing of an Internet website. The embedded web browser 154 also receives events (notifications) each of which is a notification that a respective defined event (generally related to media playback) has occurred. These events are generated by the event generator 170 and sent via the event API 172. The embedded web browser also queries properties from the properties handler 180 via the properties API 182. Properties are received in response to inquiries generated by the embedded web browser.

The command handler 160 controls the media navigator 184 including starting and stopping playback, changing audio streams, and displaying sub-pictures from JavaScript, among many things. In some variations, the media navigator can be similar to the media navigator 132 shown in FIG. 1. The command handler 160 provides live web content for non-enhanced disks when an active Internet connection is present through such commands as Enhance.NetConnect( ) and Enhance.NetDisconnect( ). The command handler 160 commands the bookmark manager 186 through such commands as Enhance.GotoBookmark( ) and Enhance.SaveBookmark( ). The command handler also interacts with the navigator state module 210 generally regarding user interaction. The navigator state module keeps the current state of the system and receives it directly from the decoder (or maps directly into it). When the bookmark manager 186 is going to save a bookmark and needs to know the current title, the bookmark manager receives it from the navigator state module 210 and places it in a bookmark and returns it to the command handler to allow it to provide a return value, for example to an Enhanced.SaveBookmark command.

The properties handler 180 provides the embedded web browser 154 with the ability to interrogate the navigator state module 210 for the media navigator 184 state which can include the properties (also referred to as attributes) of the elapsed time of the current title, the disk type, and the disk region, and other similar properties. The properties handler 180 maintains knowledge of system attributes. The event generator 170 monitors these attributes and triggers an event when a property is changed.

The event generator 170 provides notification to the media navigator 184 of events such as a change of title or chapter with web content (based on player time codes and the system time from a system timer 212). The event generator 170 notifies the properties handler 180 of event triggerings which are of interest to the properties handler. The event generator also provides events to the cookie manager 164 such as relate to the accessing of web pages, disk insertion, and disk ejection events.

The cookie manager 164 interacts with the identifier engine 214 to provide the ability to save information regarding the disc, platform, current user, the application programming interface (API) version in local storage and other information. The identifier engine 214 provides the ability to generate a unique identifier for the media which enables the media content (e.g., HTML and JavaScript from a DVD ROM) to carry out platform validation to ensure a certified device is present. The identifier engine 214, for example, provides the ability to serialize discs by reading and processing the information coded in the burst cutting area (BCA) of the disc. The BCA is read by the identifier engine and stored in the navigator state module 210. Hence commands such as Enhance.GetBCAField( ) can get the BCA information from the navigator state module after insertion of a disc. This BCA information provides the ability to uniquely identify each disk by serial number. Conditional access to content, usage tracking, and other marketing techniques are implemented thereby.

The identifier engine 214 gets the BCA information for the serial identifier (SerialID), hashes a video IFO file to identify the title (e.g., labeled the MediaID), and then reads the ROM information to establish a data identifier (DataID) for the HTML/JavaScript data on the disc. The identifier engine provides this information to the navigator state module 210 which stores this information and provides it to whichever of the command handler 160, properties handler 180, or event generator 170 utilizes it. The identifier engine interacts with the navigator state module. The identifier engine 214 receives the BCA information (read differently than files) from the I/O controller 216. The identifier engine interacts with the cookie manager 164 to place disc related information read from the BCA into a system cookie.

The initialization module 220 provides the ability to establish the media navigator environment. The initialization module 220 allows the internal states and the state modules (e.g., the navigator state module 210) to be initialized. This initialization also includes reading the current disc in the drive and initializing a system cookie. It is noted that the embedded web browser 154 interfaces which allow registering a callback for the event handler are established at power-up as well.

The navigator state module 210 provides the ability to coordinate user interaction and media content behavior with front panel controls 236 and/or a remote control 234. In one variation, arbitration of control happens in the navigator itself between the remote and front panel controls. The navigator state module 210 additionally provides arbitration of control inputs (e.g., from a remote control, pointer, keyboard and the like) to determine how to implement the selected control based on a currently active view (i.e., whether a web view or a content view is currently active), as described further below. Media navigator 184 playback is initiated by the navigator state module 210 in response to input from the initialization module 220. The navigator state module receives locations of book marked points in the video playback from the bookmark manager 186 and controls the media navigator 184 accordingly.

The bookmark manager 186 provides the ability for the JavaScript content to mark spots in video playback, and to return later to the same spot along with the saved parameters which include angle, sub-picture, audio language, and so forth. The bookmark manager provides the ability to use video bookmarks in conjunction with web bookmarks. As an example, a video bookmark is set, a web session is launched going to a preset web book marked source to retrieve video-related information, then later a return to the video at the book marked spot occurs.

The system timer 212 provides time stamps to the event generator 170 for use in determining events for synchronization or controlled playback. The system monitor 222 interacts with the properties handler 180. In one variation, the system generates a timer tick (e.g., a 900 millisecond timer tick) as an event which the HTML/JavaScript 224 uses in updating the appropriate time displays as is needed. For systems that do not have a navigator that creates events the timer is used to poll the property values every T seconds (e.g., every 900 milliseconds) and compares the poll results with a previous result. If the result changes then an event is generated to the HTML/JavaScript.

The system initialization 226 provides initialization control whenever the system is turned on or reset. The media decoder 230 generally receives the media stream from the I/O controller 216 and decodes the media stream into video and audio signals for output. The media decoder 230 receives control from the media navigator 184. A CD-DA decoder 232 receives a media stream from I/O controller 216 and decodes it into audio which it provides as output. The I/O controller 216 interfaces with media storage 156 and controls its physical movement, playback, and provides the raw output to the appropriate decoder. The I/O controller 216 also provides disk state information to identifier engine 214. The media storage 156 can be any media storage such as, but not limited to, DVD-ROM, DVD-Audio, DVD-Video, CD-ROM, CD-Audio and the like.

The present embodiment maintains at least two separate views or modes, a first view associated with the media content, and a second view associated with network content. A view can contain a variety of data, media and other information content all utilized together. The apparatus and method of the present embodiment provide for a separation of operation to ensure a separation of views for a user utilizing an electronics media device, such as, but not limited to, a set-top box, DVD player, computer, PVRs, digital media recorder/player and the like, which can be networked. As such, the present apparatus and method maintain data associated with media content in a first view (e.g., local data from the portable storage medium and/or remote data from the network) separate from unauthorized web content data in a second view received over the network (that is not necessarily related to the media content). This allows the media data owner to control the data that is associated with the media data and thus the data a user receives, and prevents unauthorized data from being associated with the media data.

In some variations, the present apparatus includes a monitor or other display to allow the apparatus to itself display media content. In some variations, the present embodiment is incorporated within media players, such as DVD players, televisions, set top boxes, electronic game devices, computers and other such media players as described above. Typically, these media players have displays for displaying the media content (e.g., displaying a movie from a DVD). The display, whether in a media player or as part of the apparatus itself, allows a user to view media content as well as network content.

In some variations, the present embodiment causes additionally controls for the operation of the apparatus to be displayed. For example, the apparatus can display information about a DVD to be played (e.g., the title of the DVD) and options for operating the apparatus (e.g., play, fast forward, games, director's interview, hyperlinks to enhanced content). The present embodiment can additionally allow a user to access the Internet. The display can show Internet options (e.g., web address, forward, backward, stop, home, search, hyperlinks and other such options) as well as Internet sites and content from Internet sites.

The present embodiment maintains an Internet, web and/or portal view as distinct and separate from the media content view. In one variation, a view can be defined as a presentation, to the consumer, of audio, video, text and static graphical or animated graphical assets, combined as per the content owner's desires. A view, using web technology can include, but is not limited to, HTML text, graphics (such as GIF and JPEG files) plus video and audio, synchronized and programmed using ECMAScript routines. These two separate views, maintain a separation of the media content and unauthorized web content. The views can be established through video frame buffers, one or more view planes and other similar techniques. Further, the present embodiment allows the web view to be as open as a computer web browser to access and display substantially any web site while remaining separate from the content view as determined by the media. This allows the present embodiment to maintain control of information and content displayed while the media content is being viewed. The present embodiment does allow the content view to incorporate and/or display content received over the network within the content view if the content received over the network is authorized by the media content owner. Maintaining control over the media content displayed allows media content owners, which use web-technology serviced from either the portable storage medium (e.g., disc) or the content-owner's network location, to maintain complete control of the display of the content owner's audio and/or visual media assets.

In one variation, the present embodiment provides for the two separate views by maintaining and/or saving operation and/or state information with regards to each of the two separate domains or views, such as textual and graphical history and the media state information (such as DVD navigator state information which could include title, chapter, audio stream, subtitles stream, elapse time and the like) and other such information for a seamless operation. The present apparatus and method additionally provides for the identification and authentication of a content stream from the network and the content-stream's associated content owner. The identification (the ability to detect a particular media stream) and authentication (ability to determine if the media stream is authentic, e.g., not an illegal copy) of the content stream and content owner can be achieved through the verification of a watermark, a serial number, a generated ID, media information, and other such identifications or combination of such identifications to appropriately provide the content owner the control over information and/or data viewed with the media content.

Content owner's retain the authority to determine the method of use, as in display or representation, of the visual assets which include, but are not limited to still images, moving images or stills captured from the moving images, and audio assets which include, but are not limited to spoken word, lyric and music. The present method and apparatus allow media content to be controlled by the content owner to protect against unauthorized use and/or association.

In web browsers of previous systems, a history is kept of Internet sites or pages visited, and navigation functions are provided (e.g., Home, Back and Forward) to allow the user to more easily shift between sites. The present method and apparatus maintain a separate history for the media-driven, content-based assets and for the web content. The present embodiment additionally manages and provides control over the media content and the separate web content. With regards to the content view, the media content has media-related state information that is maintained by a navigator. One example of state information is referred to as a bookmark. The media information can include but is not limited to a title, channel number and associated state information which is stored when switching to a web view and restored upon return to the media content view.

By maintaining the separation of views, the present embodiment can determine who should have control over the display and ensure control is limited to the entity determined to have control. As such, the present embodiment can ensure a content owner's control (e.g., exercise of rights) and minimizing potential unauthorized uses. An example of an unauthorized use would be the combination of a third party data streams (such as advertisements) with the core media stream (such as a DVD movie, streamed movie or music property) without the content owner's permission or authorization. Without such permission, the talent (movie actors, directors, musical artists and the like) may have or may assert claims to additional revenue streams potentially generated by the combination. Further, without such control, conflicts with existing partnerships or contracts may result. For example, Tiger Woods is a well know professional golfer who is sponsored by and has a contract with Nike, Inc. As such, Nike, Inc. would not want a first content featuring Tiger Woods to be associated with or viewed concurrently with a second content that included advertising for a competing shoe and/or clothing manufacturer, such as Reebok, International. Further, Tiger Woods would also probably want to prevent the first content being associated with a second content featuring advertising for Reebok without compensation, which could raise contractual issues. Ensuring the content owner's control of this combination attempts to avoid property and rights disputes and attempts to ensure that all parties are appropriately satisfied.

The present embodiment can employ a certification check to verify that the device meets these requirements before allowing the playback of the content. For example, the present embodiment can generate and maintain a list of authorized content and/or unauthorized content (e.g., authorized and/or unauthorized web sites and/or uniform resource locators (URL)).

The present embodiment additionally allows a user to access or navigate control features of the media (for example, displayed buttons of a DVD menu). In one variation, the navigation of the control features is achieved through up, down, left and right buttons or a mouse-pointer. The present embodiment further manages and allows the navigation of control features when the control features include network links (e.g., Hyper-Text Markup Language (HTML) hyperlinks) displayed in the same view. In one variation, the present embodiment includes a method and apparatus to control the selection of control items within a view (e.g., a mouse pointer, a 4-way navigation and the like).

Additionally, the present embodiment provides a method for informing the consumer that additional and/or enhanced content is available. In one variation this notification of enhanced content is achieved through the display of a symbol or logo on the content (in this case, the primary display). The logo can either be selected or "clicked" using the "enter" or "select" button on the remote control, or a predefined button can be included on the remote.

The apparatus and method can inform users and/or consumers that there are additional options and/or assets available with relation to some media content (remote or local) associated with the content. In one variation, the notification of additional assets is achieved through some graphical alert on the display, such as a graphical overlay on top of the video or a remote control light coming on. In one variation, the present embodiment allows the content owner to decide and/or dictate how and when notification occurs. This ability is not available in previous delivery systems, because the distributor of the content maintains this capability (e.g., a broadcaster in a cable systems), not the content owner.

In some variations, the present embodiment automatically detects network connectivity and determines if additional updated content (associated with the media content) is available over the network. The present embodiment can identify (and if necessary authenticate) the content locally and then search for additional content locally and/or online. Additionally, the present embodiment can identify (and if necessary authenticate) the content online if connected with the network and then determining if additional content is available. If it is determined that additional content is available, the present embodiment can inform the user of the additional content and instruct the user how to access it, or automatically download and cache the data for presentation to the user.

The present method and apparatus allows a user to switch between the content view and the web view. Further, the present embodiment allows a user to transition, within the content view, from the content and from enhanced content to a web site that is authorized by the content and back to the enhanced content or content. Knowledge of the current state of the content and/or enhanced content (web pages) as well as audio/video assets are maintained or recorded to allow switching between the content, enhanced content and authorized web sites within the content view, and switching between the content and web views. Thus, the present embodiment maintains state information between the enhanced content presentation layer(s) and the media content (e.g., a DVD video) as the content is navigated.

Figure 3:
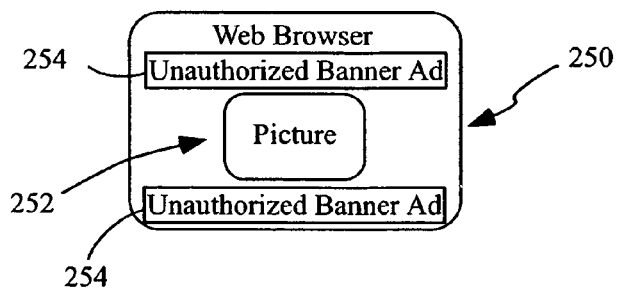
FIG. 3 shows a simplified block diagram of a display which is displaying content as well as unauthorized content.

The present embodiment maintains a content owner's control over the content and provides integrity of the audio and visual experience. As such, the use of audio and/or visual assets from a portable storage medium (e.g., DVD and CD), cached or the network is in full compliance with the content owner's wishes. One example of a misuse would be where video from a DVD is displayed (for example, on a web page) and unauthorized banner advertisements are additionally displayed or "wrapped" with the media content. FIG. 3 shows a simplified block diagram of a display 250 which is displaying content 252 (e.g., a video) as well as unauthorized content 254. One example of unauthorized content may be one or more advertising banners 254 that are related to an actor's image in a specific scene of the displayed media content.

As discussed above, the present embodiment can be networked to allow a user to gain access to the Internet and content distributed over the Internet. In maintaining separate views of media content and web content the present embodiment allows media player manufacturers the freedom in designing system players (e.g., PVRs, DVD players, CD players, computers and the like) to fully exploit the network and/or Internet capabilities without compromising content owner's rights (which can include intellectual property rights, talent rights, screen actors guild (SAG), and other similar rights). Unlike a more open, programmable computer platform (for example, a Windows PC or Apple Macintosh computer), the present method and apparatus, in one variation, can save state information for each of a plurality of views so that the plurality of views can coexist without compromising either the content owner's rights or the player manufacturer's design freedoms.

The present method and apparatus provide for a mechanism to allow the media content to query the network connectivity. This allows the media content to determine the source for additional content (e.g., enhanced, updated, new and other such content) being integrated with or displayed with the media content. The additional content can be streamed content, locally stored content and content stored on a portable storage medium. For example, with packaged media like a DVD, the additional content can be read from the ROM of the disc or from a server on the network. In one variation, the query for network connectivity includes a speed qualification that allows real-time decisions to be made based on the connection speed.

In one variation, the present method and apparatus identify the media content and/or streaming content, for example with packaged media, the title on the disc, a serial number and other such identification can be used. The present method and apparatus can further authenticate that media content, for example, verify that the title and the entire disc is authentic or verify the streaming content is from an authorized server.

In some previous media players (e.g., Microsoft WebTV™) the player provides a web browser to allow access to the Internet, or provides broadcast TV. However, these previous media players do not allow for web-content to be incorporated with or replace some or all of a TV stream. Further, these previous media players do not provide for the control of a media stream (for example, controlling the changing of an audio stream or jumping to a new chapter). In some previous broadcast TV systems, any Internet-technology based content associated with a broadcasted TV program is provided solely through the broadcaster. This is vastly different from the general-purpose and very open Internet where any web site can serve content and associate it with media content, and particularly with media content stored on a portable storage medium (e.g., DVD disc).

The present embodiment, on the other hand, provides a content owner with the capability to incorporate cached and/or streamed content with stored content (or replace stored content with cached and/or streamed content) while still maintaining control over the cached and streamed content. As such, the present embodiment allows enhanced content to be viewed while providing protection for the content owner. For example, a content owner can allow a user to access any number of internet sites that the content owner has authorized to be associated with the content. At the same time the content owner can prevent access to other web sites that are not authorized to be associated with the content. For example, Disney may authorize access to third party content, such as a toy manufacturer that makes figurines of characters in their movies. However, Disney may have a keen interest in preventing access to certain types of web sites or URLs, such as URLs associated with adult only content, from being associated with Disney's content. As such, the present embodiment allows content owner's (e.g., Disney) to prevent access to and/or association with third party content that is not authorized by the content owner.

Figure 4:
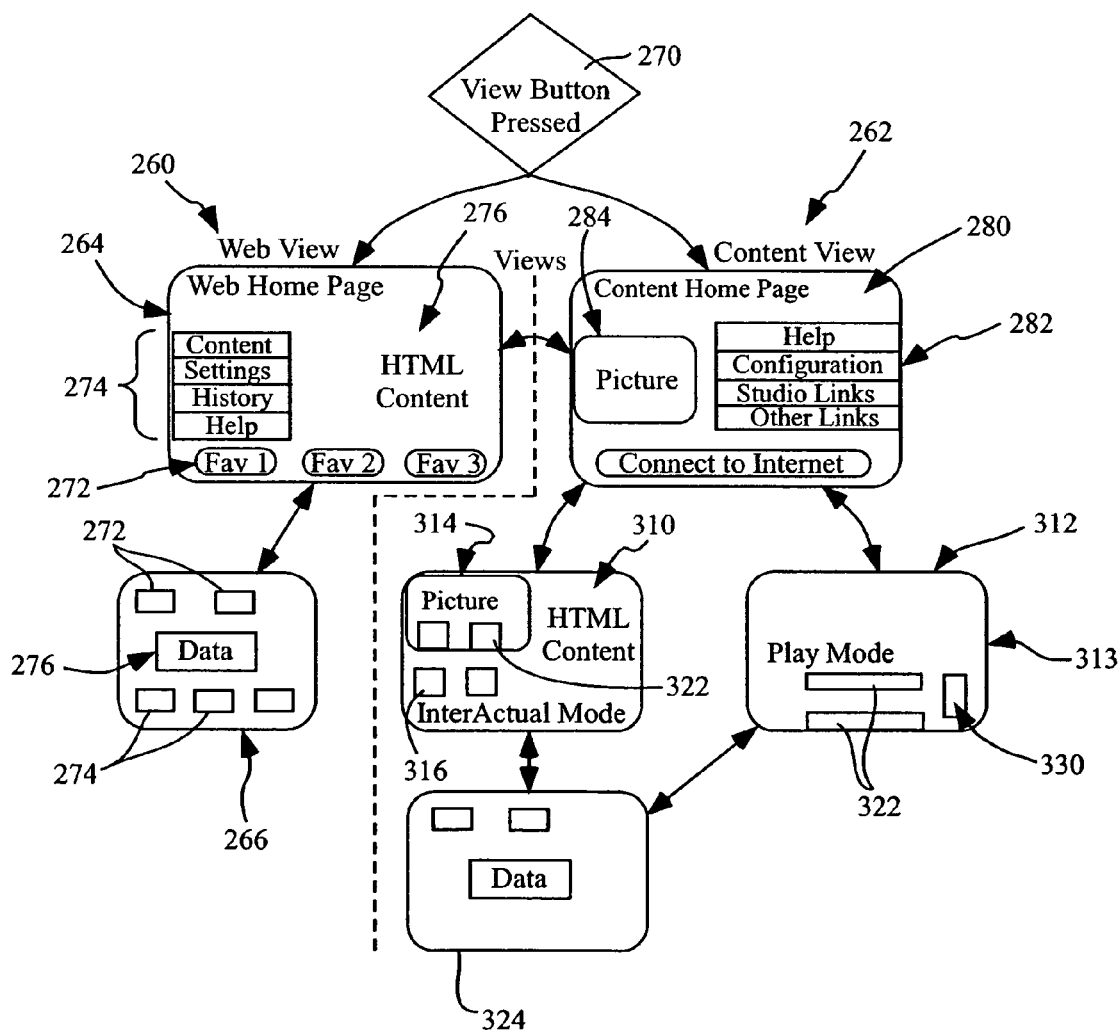
FIG. 4 depicts a simplified block diagram showing two separate potential views provided by the variations of the present embodiment and transitions between the two views.

The present embodiment can provide a user with two or more views that the user can switch back and forth between. FIG. 4 depicts a simplified block diagram showing two separate potential views provided by the present embodiment and transitions between the two views. For example, a first view 260 can be a view of the Internet and the second view can be a media content view 262. As described above, the media content view is controlled by the media content (e.g., the content on a DVD disc).

As such, the present embodiment provides two or more gateways to separate sets of content. In one variation, the two sets of content 260, 262 are available at any time for the user. In one variation, the user can shift between the two sets of content, for example by pressing a view button 270 on a control or remote control. The present embodiment can employ a graphical subsystem 138 (see FIG. 1) that can provide one or more graphic "planes" that allows the user to switch between the two sets of content. For example, two separate graphics planes can be employed where a first set of content is accessed through the first plane and the second set of content is accessed through the second plane. However, two graphics planes are not required. The two separate sets of content can be displayed through a single graphics plane such that one set of content is displayed at a time on the plane.

As discussed above, the strict separation of the two sets of content 260, 262 allows the content owner to control web and/or streaming content and the presentation of the content owner's assets (e.g., scripts, pictures, videos, and the like). In operation, the present method and apparatus allow general web content, such as web content banner advertisements and the like, to be displayed in the web view 260, as is typical in many web sites. However, the general web content can not be added to the media content view 262 by any third party unless authorized by the media content owner.

In the variation depicted in FIG. 4, a decision point 270 provides the transition between the web view 260 and the media content view 262. The decision point 270 can be a user's input, for example using a keyboard or a view button on the apparatus or a remote control. Additionally, the decision point can be configured such that there is a switch to the content view when a disc is inserted into the apparatus and/or a media player.

Typically, the decision point 270 can be activated at any stage, and at any site to transition between views 260, 262. When the transition occurs, state and/or history information is stored regarding the site and/or view being transitioned from. In entering the other view, the apparatus and method determine if state and/or history information is available for the view being entered. If there is history information, the apparatus returns to the position within the view being entered when previously switch out.

The web view 260 is activated when a user attempts to gain access to the network (e.g., the Internet). Upon initiation of the web view 260, typically a web "home" page or site 264 is accessed. The present embodiment accesses the Internet through substantially any means. For example, the web view can be controlled by a web browser. The web home page 264 can be the media player manufacturer's home page (e.g., with a logo and system specific information) a user specified page (e.g., myYahoo.com, CNN.com and the like) or substantially any other page previously defined. The web home page 264 is determined by the device settings. Often a manufacturer of the media player initially defines this home page.

Within the web view 260, the user can transition from the home page 264 to substantially any other Internet site 266, as is typical with other web browsers. As such, the web view allows a user to utilize the present embodiment to fully access the network and/or Internet. Further, the present embodiment maintains a history to allow the user to more easily navigate or steer his/her way through the Internet.

In one variation, the web view 260 operates in a similar manner as substantially any web browser. Further, the web view can be implemented through one of several web browsers known, including Microsoft's Internet Explorer™, America Online's NetScape and substantially any other independently designed or commercially available web browser. The contents of the web view are controlled by the web site owner of the site being accessed.

Typically, the web view 260 includes control features 272. The control features allow the user to navigate through the Internet to access desired web sites, information and/or content. Some examples of control features 272 can include, but are not limited to, back, forward, stop, favorite, home and the like. The web view can display additional control features 274 that allow the user to control the present method and apparatus. Some examples of the additional control features can include, but are not limited to, a decision control to allow the transition between web and content views, content selection, settings selection, history, help and other such control features. The web view additionally displays the web content 276.

The content view 262 provides a user with control over the media player and/or media content. Typically, the content view is displayed as defined by the media content. For example, the content view can initially be a content home page or site 280 (e.g., a DVD "Home"). Again, this content home page can be defined through the content. For example the content home can be a view stored on a disc in a predefined location or directory (e.g., /COMMON/INDEX.HTM from the disc ROM or CONNECT.HTM from a media player's FLASH file system (in memory)). Alternatively, the content home page can be defined on the disc as an Internet site, for example the content can provide instructions to access a specific web site, such as a site managed by the content owner or content distributor, or some other site.

The content view 262 can also contain control features 282. The content control features allow the user to control the media player and how the user wants to access the media content. The control features can be substantially any features, including, play, stop, fast forward, rewind and the like. The control features can additionally include features provided by the media content, for example, directories within the media content and options within the media content (e.g., director's interview, games, language and other such controls). The control features 282 can additionally provide access to the Internet, for example, links to the web home page 280, links to the content owner's web site and other links. The content view 262 typically includes information 284 about the media content, for example, one or more images of the content, the title, artists associated with the content, length of the content, list of the content and/or other such information.

As discussed above, the present embodiment is capable of providing enhanced content that is utilized by the media player in cooperation with existing content or in replace of existing content. The enhanced content can provide additional data that was unavailable at the time the content was initially released, the enhanced content can replace erroneous or faulty content and other such enhancements. In some variations, the media content is configured to take advantage of being able to access and utilize enhanced content. For example, a DVD can be configured to include content or instructions to access and retrieve enhanced content if available. These instructions can be stored in a predefined location to allow the media player to determine whether the media content is configured to utilize enhanced content. As an example, the DVD can include instructions in /COMMON/ INDEX.HTM as described above.

If the disc in the drive, media stored in a cache or media content being received as broadcasted or streamed content, is not previously configured to utilize enhanced content (for example instructions within a ROM content), the present embodiment can be configured to attempt to access and utilize enhanced content. The media player can include operational instructions to gain access to enhanced content. For example, the player can include instructions within a CONNECT.HTM file that is an Internet page viewed while connecting to the Internet to pull online content for the media content. The instructions within the CONNECT.HTM can be customized according to content owner recommendations and media player manufacturers input.

In some variations, the content view 262 allows a user to access an enhanced operational mode 310, and to initiate the playing of the media content in a play mode 312. In the play mode 312, the user has access to the media content, for example a movie is displayed 313 (typically in full screen) from a DVD, display a movie from streaming content, music is played from a CD and other similar access. In some variations, the apparatus and method of the present embodiment operates similar to standard media players when operating in the play mode 312, to play the DVD, CD, streaming content or other media content.

Instead of accessing the play mode, the user can access the enhanced operational mode 310. In one variation, the media content automatically instructs the media player to activate the enhanced operational mode. For example, a CD or DVD disc can include a default file where the default file defines the mode in which the content is initiated. Further, media instructions to the player can be programmed in the bit stream of streaming media. Alternatively, the user can select to enter the enhanced mode 310. When accessing the enhanced operational mode, the user is provided with options relating to enhancements of the media content. In one variation, the enhanced operational mode 310 is defined by an Internet site, or is defined within the media content.

When media is authored with enhanced operational content, the authors can create the media such that a user's experience begins with the enhanced operational mode (for example, disc ROM) content. This is an option available to the media authors at the time of authoring. There may be certain features available from the enhanced operational content that override the standard playback. As such, the enhanced operational mode allows the content to provide an enhanced, interactive experience upon selecting the enhanced mode 310, inserting the media (e.g., disc), or designed into the media stream upon starting.

The enhanced operation mode 310 allows the user to gain access to enhanced content if enhanced content related to the media content is available. The enhanced operational mode 310 typically includes one or more options or selectable items or options 316 to allow the user to steer through available options. The selectable items can direct or transfer the user to other Internet sites or windows. These selectable items 316 can include returning back to the content home page, selecting the content 314 to view the content in play mode 312, links to other sites and other similar options.

Selectable items 316 in the enhanced content (e.g., a button or hyperlink) allow the user to interact and choose a path of navigation. Selecting an item 316 can be accomplished through substantially any method including, but not limited to, a selection key on a remote control, media player remote and/or keyboard button (which can be labeled "SELECT" or "ENTER"), a pointer (e.g., a mouse) and other similar methods. Moving the selector around between items can additionally be achieved through four directional buttons: up, down, left and right, through a pointer device and the like. When the media content provides some selectable items (e.g., menus and/or selectable buttons and hyperlinks), the user can shift a selector using the four directional buttons until the desired item is highlighted. The user then selects the item using the enter or select key as described above.

In some variations, when in the content view 262, the media content 314 can occupy less than the full screen. When this is the case, the window 314 displaying the less than full view of the media content can be a selectable item. If the media content additionally includes selectable items 322, the user can select the window 314. This results in the media content becoming full screen 312. The user can then direct the selector within the full view 312 to highlight a desired selectable item 322. Alternatively, a "full screen" key or button on a keyboard, remote control or the like, can be used that has the sole function of enlarging or reducing the content can be provided. Additionally, when in full screen or play mode 312, an enhancement key or button can be provided to allow the user to transition to the enhanced operation mode 310 to allow the user to access the enhanced content with the media content reduced again to the content window 314.

From the enhanced option mode 310, the user can transition to other content 324. The other content 324 can be web sites that include enhanced content, alternate enhanced option modes and the like. The other content 324 can be accessed through selection within the enhanced option mode 310 or within the content (e.g., selection 322). For example, the user can select a hyperlink to an alternate web site that provides information about an author. This other content 324 is maintained within the content view 262. As such, the other content 324 is controlled by the content owner. This allows the content owner to provide enhanced content while maintaining control over the enhanced content associated with the content 313 being viewed.

It is noted that when in the web view 260, there is no access to the media content. The user and/or media player has to transition to the content view prior to gaining access to the media content.

In some variations, the content owner can make the user aware that additionally and/or enhanced content associated with the specific content, a specific scene, actor, location, artist, musician, author, cited text is available when in the play mode 312 of the content view 262. The content owner can author the media content in such a manner that a graphical overlay 330, completely within the content owner's control, can be shown for a short period of time on top of the content to signify additional content is available. The user can then select to view the enhanced content. For example, the user can select an "enter" button while the graphical overlay is present, the user can select an "Enhanced Content" button on a remote control and substantially any other method for pausing the linear playback and accessing this enhanced content.

Figure 5:
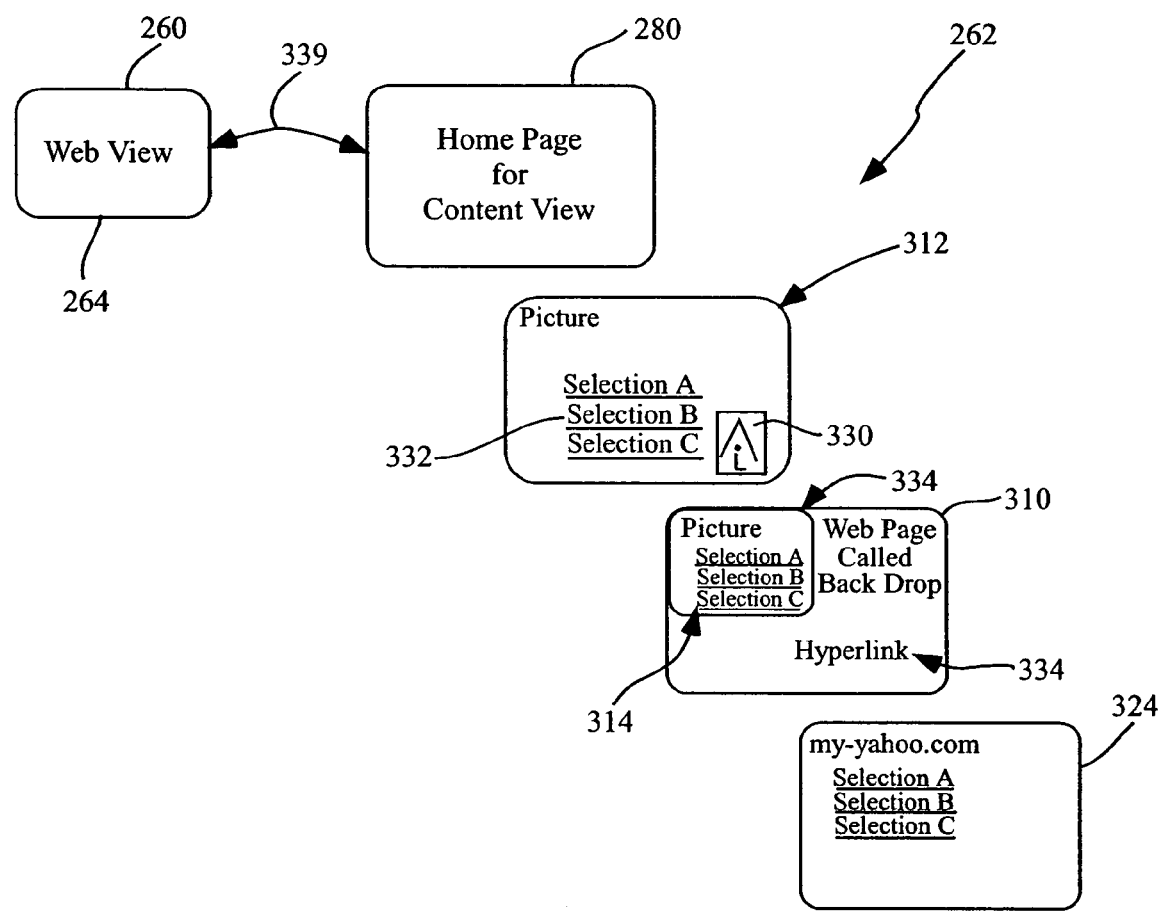
FIG. 5 depicts a simplified block diagram showing transitions between modes of operation in the content view.

FIG. 5 depicts a simplified block diagram showing transitions between modes of operation in the content view 262. The present embodiment allows the user to control the media player through substantially any method including, but not limited to, a keypad, a keyboard, a remote control, a pointer (e.g., a mouse) and other control methods. The controls can include buttons that perform specific functions. Some of the function buttons that can be included are a view button, a home button, a back button, an enhancement mode button, playback control buttons and content navigator buttons.

The view button causes a switch 339 between the web view 260 and the content view 262. The switch typically shifts to the web home site 264 or the content home site 280. In one variation, if the user is in the content view 262 but not at the content home page 280 when the user selects the view button, status and/or state information is saved regarding the content and the location within the content view (e.g., the play mode 312). When the user again selects the view button to return to the content view 262, the view transitions back to the position within the content view 262 that the user was at when the user initially selected the view button (e.g., back to the play mode 312).

A home button operates differently depending on which view the user is currently in. In the web view 260, the user selects the home button to go to the web home page 264. For example, the web home page could be the system manufacturer's home page, or a user specified page if allowed through configuration options. In the content view 262, the user transitions to the content home page 280 when the home button is selected. This content home page can be defined through an INDEX.HTM from the disc ROM or a CONNECT.HTM from a FLASH file system.

The back button operation additionally depends on which view the user is currently in. In the web view 260, the user steps back to the last web page viewed, similar to a standard web browser back button. In the content view 262, the user goes back to the last web page, content or content/web page combination that the user was on.

The enhancement mode button is dedicated to enhanced content events. These events are tailored by the media content and are context-sensitive to the content. For instance, on a certain scene of a movie being viewed through a DVD, the movie content can trigger an enhancement notification event such that if the user presses the enhancement mode button, the view transitions to a content enhancement control mode 310 where the user can access additional content, or transitioned to other content 324, such as a web site to obtain the enhanced content, for example find out more about a certain setting in a scene, such as a resort's advertisement or an actress' wardrobe.

When the content initiates this enhancement notification event, which could be done, for example, on a chapter or time basis, the navigator can optionally overlay a symbol or logo 330 transparently over the displayed content (e.g., overlay the symbol in the bottom right corner for 3-5 seconds) allowing the user to select the enhancement mode button or ignore the event as the user wishes. In one variation, this enhancement notification event is implemented through the enhancement media services 136 and the navigator's graphical subsystem 138 (see FIGS. 1 and 2).

Figure 6:
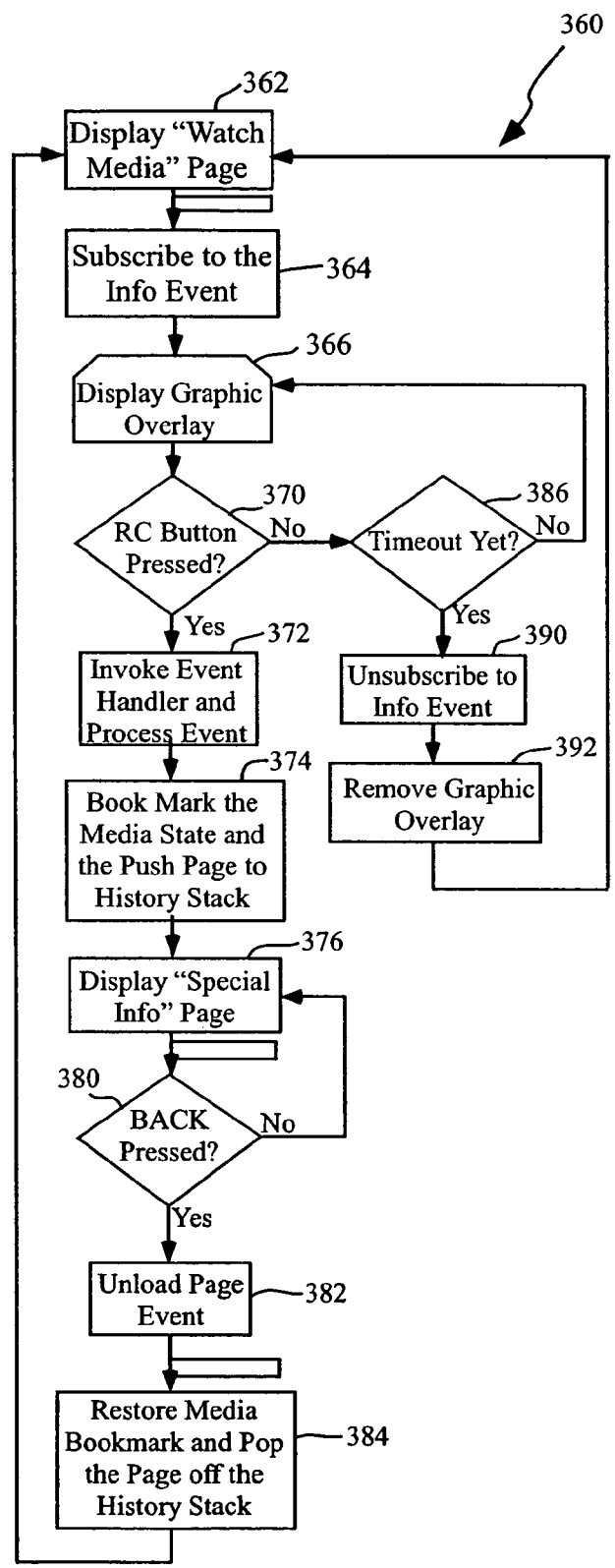
FIG. 6 depicts a simplified flow diagram of a process for generating a notification to a user in the form of a graphical overlay.

FIG. 6 depicts a simplified flow diagram of a process 360 for generating a notification to a user in the form of a graphical overlay signaling that enhanced content is available. In step 362, the media content is being accessed by the user (for example, a movie from a DVD is being displayed) and an elapsed time is being monitored. In step 364, when a predefined elapsed time is reached, an event is triggered. For example, a JavaScript subscribes to an Info event. In step 366 the Info event causes the navigator 132 (see FIGS. 1 and 2) to overlay a graphic icon over the video image. In step 370, it is determined if the user makes a selection to access the enhanced content. For example, it is determined if the user selects a button on the remote control.

If, in step 370, the user makes the selection, an event is triggered and the process 360 proceeds to step 372 where the event handler is invoked to process the selection event to access the enhanced content. In step 374, a bookmark is generated of the content to record the state of the content, and the content view history is maintained. In step 376, the enhanced content is displayed. In step 380, it is determined if the event has been terminated. For example, the user can selected to return to the content (e.g., using the "back" button), a time period may have elapsed, or other similar events can occur. If the termination event has not occurred, the process returns to step 376 to continue displaying the enhanced content. If the termination event has occurred, the process proceeds to step 382 where an event is triggered to unload the enhanced content. In step 384, the content is restored utilizing the bookmark. For example, the content page can be popped back off through the history stack.

If, in step 370, the selection to access the enhanced content is not received, the process transitions to step 386 where it is determined if the notification has been displayed for a predefined period (e.g., 5-10 seconds). If not, the process returns to step 366 to continue displaying the notification. If the time has expired, the process proceeds to step 390 where an unsubscribed event occurs triggering the removal of the notification from the display.

As discussed above, the present embodiment utilizes events to initiate any number of functions, operations and/or procedures. In many instances these events are implemented through ECMAScripts. ECMAScripts (JavaScripts) support several types of events. The event generator 170 (see FIG. 1) generates these events based on inputs which initiate the generation of the events. These inputs can be inputs from the user, from the media content, the media player, web content and other similar inputs. For example, an event can be initiated after a certain time has elapsed during the playing of a movie, or an event is generated when a user selects or "clicks" an option or button shown on a display, a button on a remote control or other selections. The event generated when a user selects a button is different than when the Internet browser loads a new document, page, Internet site, and the like. Different inputs, options or objects can generate different events. An "onclick" event is generated when a user selects a displayed button, but not when text is selected.

When an event occurs (e.g., a user's action against a certain object) an event handler is invoked. Certain events are triggered by classes of objects or options. An event handler is associated with each event type by programmatic control. As such, the media content can implement one or more event handlers associated with the various types of events supported. A single event handler can include many sub-categories of events, such as title events, chapter events, elapse time events and the like. Events and event handlers are more fully described in co-pending U.S. patent application Ser. No. 09/935,756, now U.S. Pat. No. 7,178,106, entitled PRESENTATION OF MEDIA CONTENT FROM MULTIPLE MEDIA SOURCES, filed on Aug. 21, 2001, which is incorporated herein by reference in its entirety.

In one variation, if the media content is not capable of utilizing enhanced content, then the content home page 280 (established through, for example, CONNECT.HTM) is displayed and a request for an Internet connection is made, or the content home page automatically connects to the internet based on the system configuration. If the Internet connection is established, then content from a web server is used (if authorized and/or provided by the content owner). If there is no online content available for the media content, the user is notified and allowed to resume access to the media content (e.g., allowed to resume playback in play mode 312).

If there is no media content accessed (e.g., no disc in the drive) and the enhancement mode button is pressed, then the system requests the user to load the media content. For example, the system can display a "NO CONTENT" or "NO DISC" screen. If the enhancement mode button is selected and it is not active, a "not available" window or symbol is displayed.

The playback control buttons include standard transport control buttons (e.g., stop, play, previous, next, and the like) to control the media content access (for example, a video play) when there is content accessed. For example, playback control buttons provide control of streaming video displayed on the screen, either full screen 312 or in a window 314 embedded within the enhancement control 310 display.

The media content navigation buttons can include up, down, left, right, enter and other similar buttons. The content navigation buttons typically are configured not to work for content navigation (e.g., menu selections) unless the content is in full screen play mode 312. When in play mode, the content navigation buttons allow the user to transition between potential options and/or controls 332 associated with the content being accessed. Alternatively, if the content is in a window 314 embedded in a web page 310, or the content view is in an authorized web page 324 the content navigation buttons serve to navigate the web page highlights (e.g., for selecting HTML hyperlinks 334). The windowed content object 314 can also be configured as a selectable hyperlink 334. The user positions the highlight to the content window 314 and selects it by pressing "enter," (or some other similar button) which causes the content to transition to full screen 312. Additionally, the present embodiment can be implemented with a free-moving pointer, such as a PC mouse, to allow selections of the content window 314 or other options.

The present embodiment allows the web view to be maintained as distinct and separate from a media view. At least two separate display flows (which can include operation and/or state information) are maintain and/or saved. These separate flows are distinguished by associating each flow with a separate domain or view. As such, the present method and apparatus are capable of maintaining separate flow histories for each of one or more media content assets and one or more Internet content assets.

Figure 7:
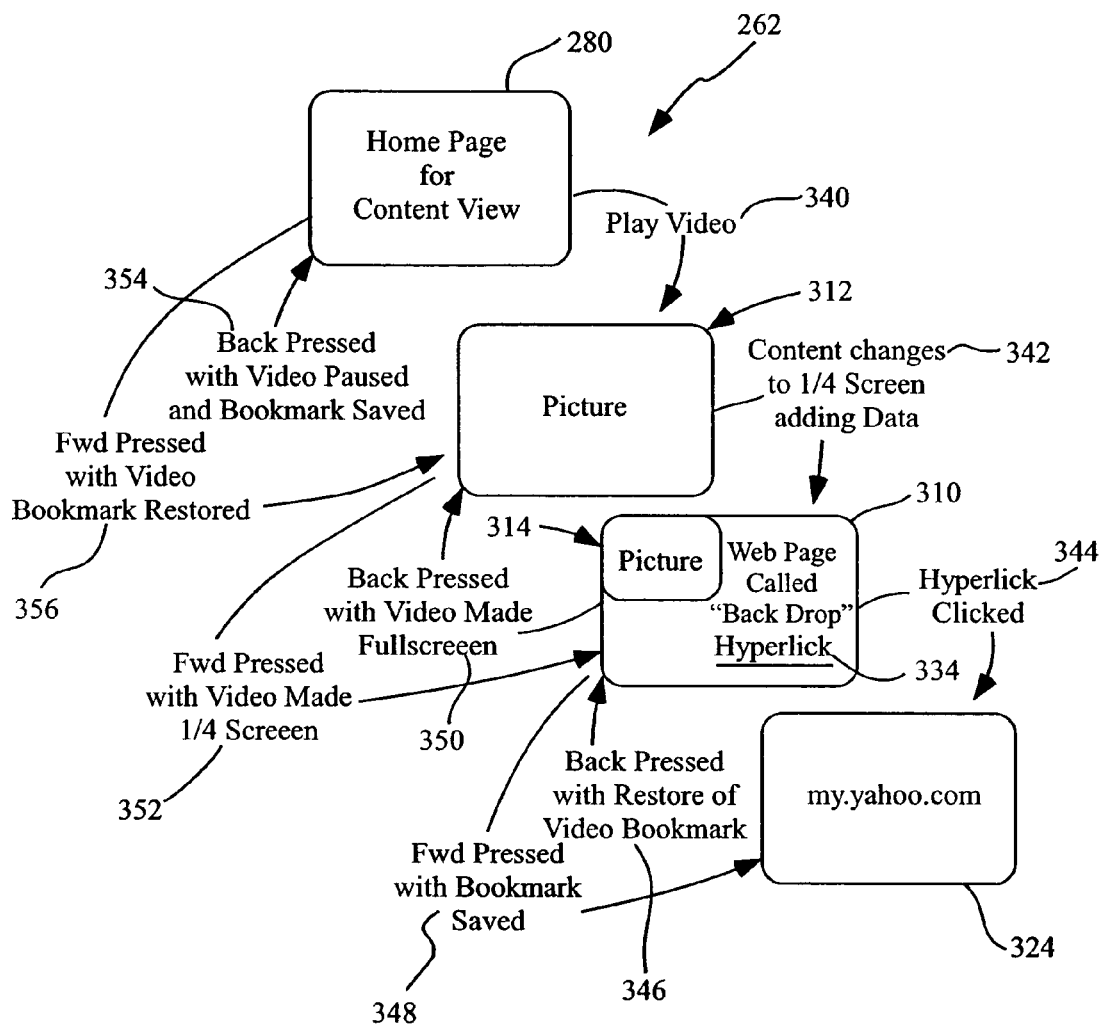
FIG. 7 depicts a simplified block diagram showing transitions from one mode to another mode within a single view where histories and/or states are maintained for the separate views according to one variation of the present embodiment.

FIG. 7 depicts a simplified block diagram showing transitions from one mode to another mode within a single view (e.g., content view 262) where histories and/or states are maintained for the separate views according to one variation of the present embodiment. The example shown in FIG. 7 depicts how a media content history (such as a streaming video being displayed) that can be saved and restored when transiting between the media content and an Internet site. In one variation, the media content history is saved in association with a given web or web plus media (e.g., audio/video) presentation.

For example, the apparatus and method initially provide a content home page 280. A user can select to view the media content so there is a transition 340 to the play mode 312. For example the user can select to view a streaming video, such that there is a transition 340 to display the streaming content in full screen 312. Alternatively, the media player can transition to play mode 312 to play the media content upon receipt of the streaming media or upon insertion of a disc within the player. While in the play mode 312, the user can select to transition 342 to a content enhancement control 310 or an internet page 310 and/or 324 at predefined times within the access to the media content or at substantially any point before, during and/or after accessing the media content.

The present embodiment maintains and/or tracks the user's transitions between content. If in the content view 262, the user is accessing an enhancement control page 310 that includes a content window 314 (for instance, ¼ screen size) playing a specific streaming video title with associated scene information and/or links 334 displayed within the page 310, and the user selects to switch or transition 344 to an other web site 324 (e.g., a transition to my.yahoo.com), the present embodiment allows the user to pick up the video exactly where the user left off when the user returns 346 to the enhancement control site 310. In saving history and/or state information, the present embodiment allows the user to transition between modes (280, 312, 310, 324) utilizing back, forward, home and other functional options.

The present embodiment keeps a stack or record of history information associated with the content view 262. When switching from the play mode 312 (or the enhancement control mode 310) to a web site 324, the media content is halted or paused and a content bookmark (which can include a title number, elapsed time, chapter number, angle number, subpicture number, audio number and other state information or combination of information) is saved and kept in association with the content and/or active page (e.g., when transitioning from enhancement control 310 to another web site 324). In some instances, when there is a transition from play mode 312 to the enhancement control mode 310, the content is halted and a bookmark is recorded. The content bookmark is used to restore the content (e.g., content window 314 or full screen) upon returning from a transition (for example, from the play mode 312 to anther web site 324, and back to the play mode). In one variation, the elapsed time is utilized from the bookmark to resume playing the content at substantially the same point the playing of the content was previously halted. The elapsed time can allow the present embodiment to resume playing to within microseconds, and preferably within milliseconds of the point where the content was previously halted.

Still referring to FIG. 7, the user can select and transition 340 from content home page 280 to the full screen play mode 312. The present embodiment retains the transition within the history stack. If the user wishes to obtain enhanced content, the user can select and transition 342 to the enhancement control 310. In some instances, the media content is halted and a bookmark is stored. Again, the transition 342 is stored in the history stack, and if a bookmark was recorded, the bookmark is associated with the transition 342. The user can select to transition 344 to access enhanced content, for example, by selecting a hyperlink 334 to transition to a web site 324. The transition 344 is recorded in the history stack. If the content is still being played in the enhancement control mode 310 (e.g., in the small content window 314), a content bookmark is stored and associated with the transition history.

When the user wishes to return from the web site 324 to the enhancement control 310, the user can select the back button. The history stack is accessed and utilized to control the transition 346 back to the enhancement control 310. Further, the bookmark (if available) is accessed to restore the content to continue playing from the point in the content where the transition occurred. The user can also select the forward button to again return to the web site 324. The forward transition 348 is stored in the history stack along with a new bookmark.

From the enhancement control 310, the user can again select the back button where the history is accessed and directs a return transition 350 to the full screen play mode 312. The bookmark is also accessed to resume playing the content from the point where it was halted. The user can again utilize the forward button where the history stack directs the switch 352 to the enhancement control 310.

The user can transition 354 from the play mode 312 to the content home page 280 by again selecting the back button, where the history stack directs the return to the content home page. Further, a bookmark is recorded if the content is still being accessed (e.g., if a streaming video is still being displayed where the movie is not over). The forward button can transition 356 the user back to the play mode 312, with the bookmark returning the playback to the point where the playback of content was halted.

Similar transition histories are recorded for transitions within the web view. These transition histories can be employed similar to histories recorded in existing web browsers. As such, the user can steer through the Internet using the back, forward, home and other options. In one variation, the present embodiment maintains at least two separate history stacks, one for the content view and one for the web view, when both web and content views are accessed. This aids in maintaining control over the additional and/or enhanced content that is associated with the media content.

Still referring to FIG. 7, in one variation, the transition 342 from full screen 312 to control mode 310 with the partial screen 314 embedded therein can be a transition from one Internet site (full screen 312) to another Internet site (control mode 310). As such, the "back" 350 and "forward" 352 transitions additionally cause transitions between Internet sites.

In an alternate variation, the content (e.g., DVD video content) can be hosted by a single Internet page and displayed within that Internet page. For example, the content control mode 310 can be an Internet page that hosts and displays the video content. Within this control mode page 310, the video content can be displayed in full screen 312 or the video content can be display in a partial screen 314. However, the transition from full screen 312 to the partial screen 314 does not cause a transition from one Internet site to another Internet site. The transition from full screen to partial screen (and vise versa) is still within the same control mode Internet site 310. As such, the transition 342 from full screen to control mode, as well as the "back" and "forward" transitions 350 and 352, respectively, do not cause transitions between Internet sites, but cause a manipulation (e.g., resizing) of the content within the same control mode 310. In one variation, the video asset can be displayed in a frame with HTML content around the video.

In this implementation, the "back" 350 and "forward" 342 controls provide the manipulation of the content within the control mode Internet site 310 according to the history. Alternatively, and/or additionally, there can be other controls which cause a transition from full screen image within the control mode Internet site to the partial screen image within the control mode Internet site. For example, there can be a "Full" button on a remote control, displayed as a selection option and other similar controls that cause the transition between full and partial content imaging. Additionally, the history could be configured to track these transitions to allow "back" and "forward" to be utilized.

Figure 8:
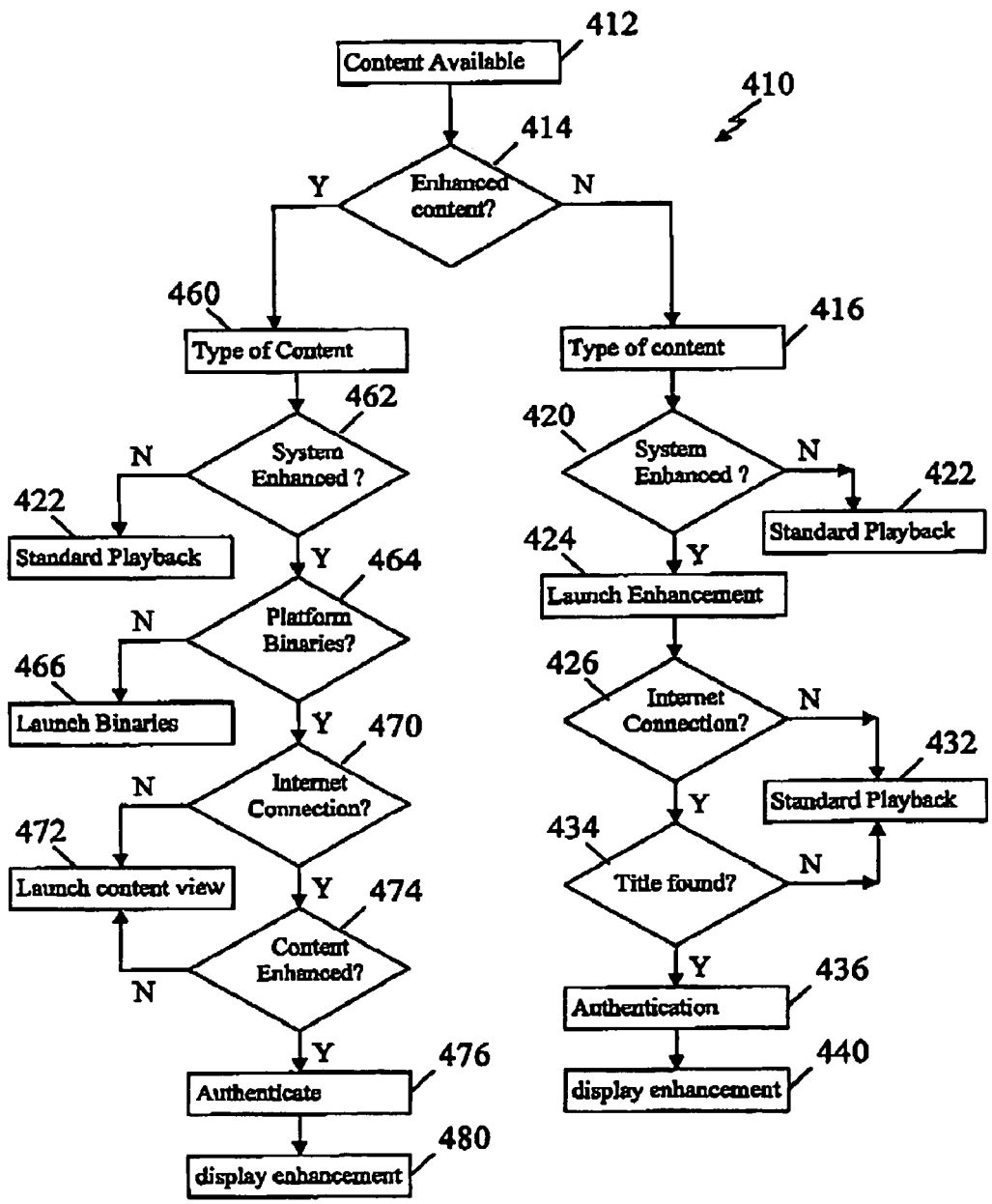
FIG. 8 shows a flow diagram of a process for initiating media content in a content view to allow a user to access the content.

FIG. 8 shows a flow diagram of a process 410 for initiating media content in a content view to allow a user to access the content. Typically, with packaged media (e.g., DVD discs, CD discs and other such packaged media), the process 410 only has relevance when the packaged media is available to the content player, for example when the disc is inserted in the player's disc tray (or into an active disc slot if the player is a disc changer supporting multiple discs). For streamed media or some other delivery mechanism, the process 410 is applicable when the content is available to the player. For example, when the user selects the streamed content, the content selection mechanism (e.g., a file sector in a streamed media file system) functions analogously to inserting the disc in a tray.

In step 412, the media content is made available (e.g., the user inserts a disc, or selects and receives streaming content). In step 414, it is determined if the media content is configured for enhanced content operation. This determination can be accomplished, for example, by locating the INDEX.HTM file in the COMMON directory on the disc or locating similar information within the streaming content.

If the content is not configured for enhanced operation, the process proceeds to step 416 where the type of content is determined. For example, the process can determine if the content is a DVD-Video or DVD-Audio or CD-DA. Such logic is known in the art and built into some DVD players, as such the logic is not further described. Once the type of content is determined, step 420 is entered where it is determined if the media content player (e.g., DVD player) is configured to access and utilize enhanced content. If not, step 422 is entered where the player is activated to provide standard playback of the content in the play mode and enhanced content features (or platform-specific features) are bypassed. For example, a standard DVD playback or standard CD-DA playback can be initiated.

If, in step 420, the content player is configured to utilize enhanced content, step 424 is entered where enhanced content operation is launched. For example, this can be launched with access to COMMON/INDEX.HTM to display the content home page in the content view. As described further below, the content itself can be updated dynamically if there is an Internet connection. If there is no Internet connection, the player provides standard playback.

With content that is not configured for enhanced operation (as determined in step 414) where the player is configured to provide enhanced content, a default content home page (e.g., CONNECT.HTM) is displayed in step 424 and an Internet connection (see below) is attempted to potentially provide web content for the content.

Following step 424, step 426 is entered where the process 410 determines if an Internet connection can be established. If an Internet connection cannot be established, step 432 is entered where standard playback of the content is launched. If an Internet connection can be established, step 434 is entered where it is determined if the content has additional or enhanced content that can be utilized. For example, a title search of the content can be performed to see if there is enhanced content associated with that title. If there is not enhanced content, the process proceeds to step 432 for standard playback.

If there is enhanced content, the process proceeds to step 436 where the content is authenticated. If the content is authenticated, step 440 is entered where enhanced content is delivered and can be displayed. This display of the enhanced content can be incorporated with the existing content (for example, replacing part of a movie), can be additional content (for example, additional song from a musical group), can be additional information about the content (for example, information about the director, actor and locations of a movie), and other such content. This step determines if there is updated or enhanced content to be made available from a web server.

If it is determined in step 414 that the content is configured for enhanced operation, the process proceeds to step 460 where the type of content is determined (DVD-video, DVD-audio, CD-DA, streaming video, streaming audio and the like). Once the type of content is determined step 462 is entered where it is determined if the media content player is configured to access and utilize enhanced content. If not, the process 410 proceeds to step 422 where the player is activated to provide standard playback of the content in the play mode and enhanced content features (or platform-specific features) are bypassed.

If, in step 462, the content player is configured to utilize enhanced content, step 464 is entered where it is determined if there are platform-specific binary files for this platform within the content. This can be accomplished by searching for a predefined directory structure associated with the playback system. If there are platform specific binaries, the process proceeds to step 466 where the player launches the platform specific binaries (whether DVD binaries, CD-DA binaries and the like).

If there are not specific binaries, step 470 is entered where the process 410 determines if an Internet connection can be established. If an Internet connection cannot be established, step 472 is entered where the media player initiates the content view. Typically, the media player displays the content home page as defined by the content (e.g., the content home page can be defined through an INDEX.HTML file within the content). This allows the user to being interaction with the content, for example to activate the play mode.

If an Internet connection can be established, step 474 is entered where it is determined if the content has additional or enhanced content that can be utilized. For example, a title search of the content can be performed to see if there is enhanced content associated with that title. If there is not enhanced content, the process proceeds to step 472 for content view launch.

If there is enhanced content, the process proceeds to step 476 where the content is authenticated. If the content is authenticated, step 480 is entered where enhanced content is delivered and can be displayed. This step determines if there is updated or enhanced content to be made available from a web server.

In one variation, identifying content includes creating a unique identifier based on a hash code derived from the content (for example, from an IFO file or files of the title). This would remain the same whenever the IFO file of the disc has not changed. Alternate methods may be used to create similar identifiers. This identifier can be mused as a key or used to generate a key. The key can then be used to identify the content. In one variation, the key is used to search a title database. If the key is found the content is verified as identified.

In some instances, this generated key is insufficient for authentication. A pirated, "bit for bit" copy of the video files of a disc could thwart this authentication of the content. As such, the present embodiment can authenticate the content. Typically, the authentication is performed at a remote server by combining other data, such as a BCA number or volume information contained elsewhere with the generated key and that cannot be easily copied to provide the identifier. The identifier can include substantially any information that identifies the content including the title, the BCA number, the volume information, a serial number, a hologram, a watermark and substantially any other information that can be used to identify the content. In one variation, the identifier can be computed from the media content utilizing a checksum or similar mathematical computation.

In one variation, authentication of content is achieved by deriving the identifier information from the original content that cannot be copied or altered. For example, the information extracted and/or derived from the content can include, but is not limited to, volume information (e.g., in the header of a physical disc layer), a serial number (with a DVD, the serial number is sometimes found in the burst cutting area), a BCA of the disc and other such information. The authenticating information is readable by each drive (local and remote). However, the authenticating information is not capable of being copied from media to media, or from stream to stream (in the case of online content or content not distributed on physical media).

If the content is not authenticated, for example through the online database query checking for updated content, then only local content (e.g., disc ROM content in the content player) can be accessed. As such, a compact disc-recordable (CD-R) and compact disc-rewritable (CD-RW) copy of an audio CD goes through the authentication flow, it would not pass the authentication test and the enhanced online content would not be served to the consumer. The present embodiment can additionally track the number of attempts by non-authentic content to attempt to access enhanced content, which can be useful to the content owners. In one variation, prior to allowing access to or displaying enhanced content (e.g., HTML content), the identifier is retrieved or computed for the media content. This identifier is compared with expected identifiers for which the enhanced content has been authorized to be associated with. If the comparison fails, a failure notification can be issued (e.g., a failure HTML pop-up window is displayed).

In one variation, the media content can be associated with a list of URLs that are authorized to be associated with the media content. For example, a DVD containing a movie owned by New Line can be associated with a list of URLs to access content relating to other movies owned by New Line. Additionally, the media content can be associated with a list of URLs that are not authorized, and thus cannot be associated with, the media content. For example, streaming content of a Disney movie can be associated with a list of URLs containing adult only content with which the Disney movie specifically cannot be associated. The authorized and/or unauthorized lists can be stored directly with the media content (or delivered with the media content in the cast of streaming content). The lists can also be remotely stored and associated with media content through the media content's identifier when a user attempts to obtain enhanced content.

Figure 9:
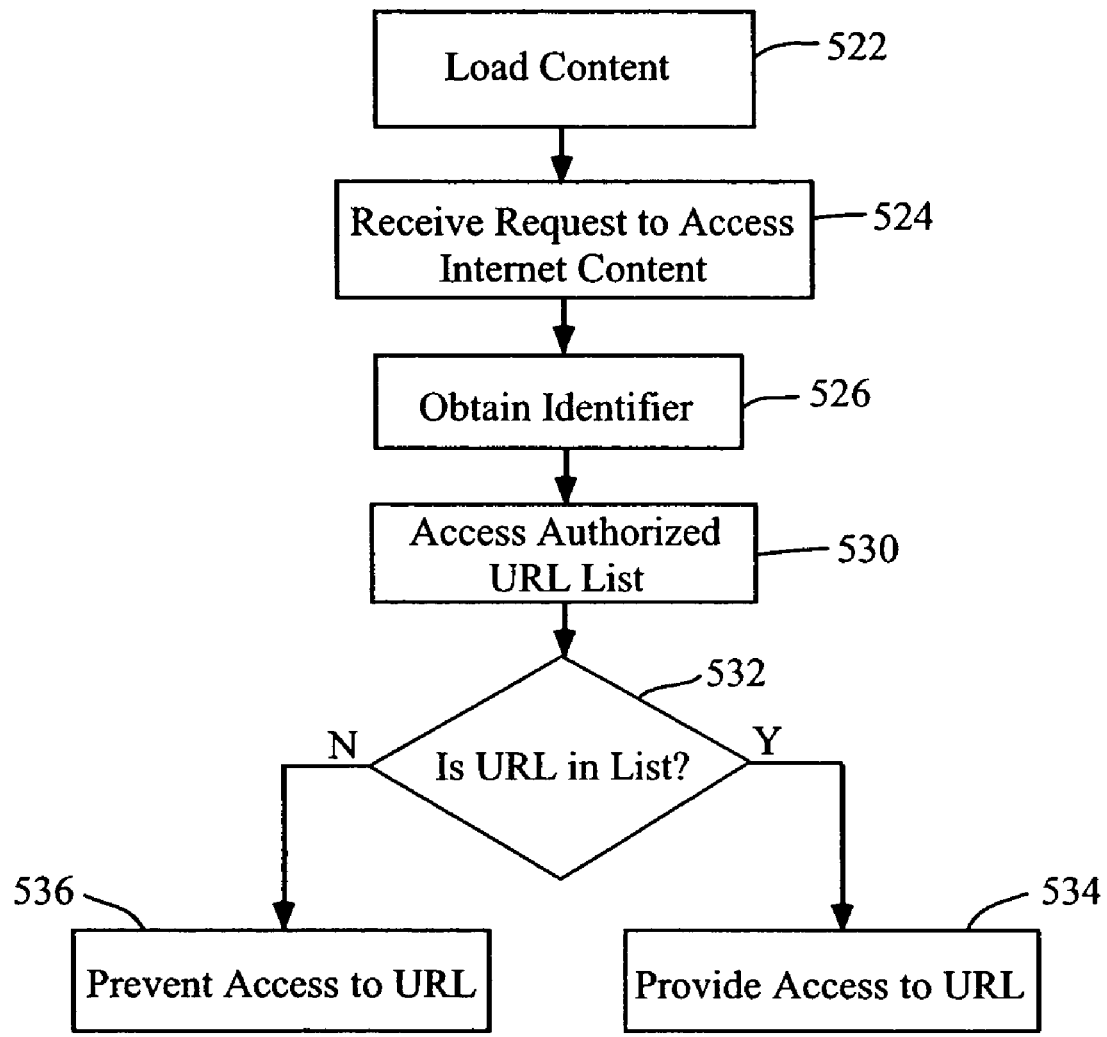
FIG. 9 depicts a simplified flow diagram of a process for determining if enhanced content is authorized to be associated with media content.

FIG. 9 depicts a simplified flow diagram of a process 520 for determining if enhanced content is authorized to be associated with media content. In step 522, the media content is loaded into the content view. In step 524, a user submits a request to access Internet content. In step 526, a media content identifier is received, extracted and/or calculated. In step 530 a list of authorized URLs is accessed. Again, this list can be stored with the media content or can be remotely accessed. In step 532, it is determined if the Internet content URL attempting to be accessed is included within the authorized list. If the Internet content URL is on the list, step 534 is entered where the user is allowed access to the authorized Internet content If in step 532 it is determined that the Internet content URL is not on the authorized list, the requested Internet content is not displayed, and an error or other notification is issued (e.g., an error message is displayed in a pop-up window).

The enhanced content can be provided by a third party. However, the third party may want to limit the content supplied to a user when the user is trying to access enhanced content. For example, the third party may want to only supply enhanced content that the third party (the media content owner, or some other entity) has determined to be associated with the media content. As such, the third party can verify and identification of the media content. This can be performed utilizing the title of the media content or other similar methods. Once identified, the third party can then determine what enhanced content is associated with the media content and limit a user's access to that enhanced content associated with the media content. In one variation, the third party does not perform authentication. The third party only identifies the media content to ensure the enhanced content accessed by the user is limited to enhanced content associated with the media content.

In one variation, the present method and apparatus additionally provide access to enhanced content even for media content that is not configured for enhanced interaction. The present method and apparatus can be configured to establish a connection to one or more remote servers (assuming the content player is coupled with the network and/or Internet) to determine if there is enhanced content available for current media content. If there is such enhanced content, the present embodiment offers substantially the same interactive experience to the user as content configured for the enhanced interaction affords. In one variation, the enhanced content is also authenticated prior to allowing access to that content.

When the player is in the play mode, authored enhanced content can display a symbol or logo to signify that there is additional and/or enhanced content available from content itself (e.g., stored on the disc ROM) and/or from a remote server. If the consumer clicks the enhancement button on the remote control (as described above), the content view is displayed and the user can transition to the content enhancement control mode for the content and allowing access to the additional and/or enhanced content.

In one variation, the key generated locally by the media player can be placed in an Internet cookie for use by the remote server. This method of delivery enables the server to retrieve the key out of the cookie and use it in verifying and authenticating the content, for example using a database lookup (either locally or remotely). The use of a cookie in this manner is opposite to how cookies are normally utilizes where the server issues the cookie. In the present embodiment, the key can be placed by the media player into the cookie. In one variation, cookies can be placed in multiple domains on the client. As such, the insertion of the key is not limited to a single domain, but instead can be applied to any number of domains.

The present embodiment can also provide for the content owner to be identified through a database lookup or initialization file (either locally in the player or on a remote server) and the domain set based upon the preset definition (e.g., Warner Bros., MGM and other content owners can be identified and the domain set based on the table entry for Warner, such as www.warnerbros.com). This database lookup or initialization file could contain several entries, or the single domain to be used for the content could be explicitly identified in a disc configuration file.

The present method and apparatus can connect directly to the enhanced content, or can connect through piping such that the media player can be routed through an intermediate sever and then routed to the correct domain to access the enhanced content. In one variation, the present embodiment can access alternate and/or enhanced content through an alternate or third server or domain. As such, a connection to substantially any online domain can be achieved through a separate communication pipe or socket connection. A communication component, which can be a separate functional component, running on the client device, can activate or open a separate communication pipe with a third server and place the key in an HTTP header file and post it to the third server. The third server can be substantially any server. The third server can then determine authorization and/or authentication, or the third party serve can route the key to a server containing the enhanced content. The authentication of the content can cause enhanced content to be pushed down to the client offering the user the enhanced content. Obtaining authentication through the communication piping has no domain restrictions. As such, the content player can display content from substantially any domain.

As described above, the present embodiment provides access to substantially any type of media content. Further, the present embodiment can be utilized in substantially any type of media player device including a DVD player, CD player, PVR and other devices where content is cached into the device, computers and other devices where content is pre-cached and then up-dated through a remote server, set-top-boxes, and substantially any other type of media player device. The content and/or enhanced content do not have to be physically stored content or maintained on a specific physical media. For example, the present embodiment can access video on demand (VOD) content that can be updated through the network connection. Further, the media content can be updated and/or enhanced prior to being transmitted to the user allowing the content owner control over the updated and/or enhanced content.

While the embodiment herein disclosed has been described by means of specific variations and applications thereof, numerous modifications and variations could be made thereto by those skilled in the art without departing from the scope of the embodiment.

What is claimed is:

1. A method for providing access to media content, comprising the steps of:
    initiating a first view;
    providing access to at least a portion of a first content within the first view;
    initiating a second view;
    providing access to a second content within the second view;
    receiving a request to access second content with the first content in the first view;
    determining whether the second content is authorized to be accessed with the first content in the first view; and
    preventing the second content from being accessed with the first content in the first view when it is determined that the second content cannot be accessed with the first content in the first view.

2. The method as claimed in claim 1, further comprising the step of:
    receiving a request to view a third content with the first content in the first view;
    determining whether the third content can be viewed with the first content in the first view;
    preventing access to the third content with the first content in the first view when it is determined that the third content cannot be accessed with the first content in the first view; and
    allowing access to the third content with the first content in the first view when it is determined that the third content can be accessed with the first content in the first view.

3. The method as claimed in claim 2, wherein the step of providing access to the third content includes providing access when the third content is authorized.

4. The method as claimed in claim 3, wherein the third content is authorized when the third content is found in the list of authorized content associated with the first content.

5. The method as claimed in claim 2, further comprising the step of:
    authenticating the first content prior to providing access to the third content.

6. The method as claimed in claim 2, further comprising the step of:
    maintaining a first history of the first view;
    generating a bookmark for the first content prior to the step of providing access to the third content; and
    associating the bookmark with the first history.

7. The method as claimed in claim 2, further comprising the steps of:

notifying that the third content is available; and switching to the third content once a request to access the third content is received.

8. The method as claimed in claim 1, further comprising the steps of:

maintaining a first history of the first view; and providing navigation through the first view according to the first history;

wherein the first history comprises a plurality of transitions through the content in the first view and a transition from the content in the first view to the second content in the second view.

9. The method as claimed in claim 8, further comprising the steps of:

maintaining a second history of the second view separate from the first history; and providing navigation through the second view according to the second history;

wherein the second history comprises a plurality of transitions through the second content in the second view and a transition from the second content in the second view to the content in the first view.

10. The method as claimed in claim 1, further comprising the steps of:

identifying the first content; and authenticating the first content, wherein the step of providing access to at least the portion of the first content occurs if the first content is authenticated.

11. The method as claimed in claim 1, wherein determining whether the second content is authorized to be accessed with the first content comprises:

accessing a database associated with the first content; and looking up information about the second content in the database.

12. The method as claimed in claim 11, wherein accessing the database comprises:

identifying the first content; and locating a database associated with the first content based on the identification.

13. The method as claimed in claim 11, wherein the database comprises a list of authorized content, and wherein the second content is authorized if the information about the second content is found in the list.

14. The method as claimed in claim 11, wherein the database comprises a list of unauthorized content, and wherein the second content is authorized if the information about the second content is not found in the list.

15. The method as claimed in claim 1, further comprising the steps of:

identifying the first content;

receiving additional information regarding the first content;

authenticating the first content;

allowing access to the second content with the first content in the first view when the first content is authenticated and it is determined that the second content can be accessed with the first content in the first view; and preventing access to the second content when the first content is not authenticated.

16. An apparatus for providing access to content, comprising:

a first view configured to provide access to a first content;

a second view configured to provide access to a second content; and a graphical subsystem configured to determine whether the second content is authorized to be viewed in the first view and further configured to prevent the second content from being accessed in the first view when the second content is not authorized to be viewed in the first view.

17. The apparatus as claimed in claim 16, wherein the graphical subsystem is further configured to compile a first history stack associated with the first view and a second history stack associated with the second view.

18. The apparatus as claimed in claim 16, further comprising:

a first home site associated with the first view; and a second home site associated with the second view.

19. The apparatus as claimed in claim 16, wherein:

the first view is a media content view and the first content is media content; and the second view is a web view and the second content is Internet content.

20. The apparatus as claimed in claim 16, wherein the first view being configured to provide access to a third content, when it is determined that the third content is authorized to be associated with the first content.

21. The apparatus as claimed in claim 16, further comprising:

a display, wherein the first view and second view are shown on the display.

22. The apparatus as claimed in claim 16, wherein the graphical subsystem is further configured to:

identify the second content;

access authorization information associated with the first content; and determine whether the second content is authorized based on the authorization information.

23. A method for providing access to content, comprising the steps of:

receiving a key generated from information extracted from a first content;

identifying the first content based on the key;

receiving additional information regarding the first content;

authenticating the first content based on the key and the additional information; and allowing access to a second content.

24. The method as claimed in claim 23, wherein the step of identifying the first content includes matching the key with an entry in a database.

25. The method as claimed in claim 23, wherein the additional information includes an identifier.

26. The method as claimed in claim 23, further comprising the steps of preventing access to the second content if the first content is not authenticated.

27. The method as claimed in claim 23, further comprising the steps of:

accessing the first content;

extracting the information from the first content;

generating the key based on the extracted information;

collecting the additional information regarding the first content;

forwarding the key to be identified;

forwarding the additional information; and accessing the second content when an authentication is received.

28. A method for providing access to content, comprising the steps of:

providing access to a first content;

determining that a second content is preassociated with the first content;

notifying a user that the second content is available;

searching for additional content not preassociated with the first content and authorized to be viewed with the first content;

notifying the user that the additional content is available when the additional content is located;

transitioning to the second content if a first selection is received; and transitioning to the additional content if a second selection is received.

29. The method as claimed in claim 28, further comprising the step of:

generating a notification event, wherein the step of notifying is initiated by the notification event.

30. The method as claimed in claim 28, wherein the step of notifying includes generating a graphical overlay and displaying the graphical overlay over at least a portion of a display of the first content.

31. The method as claimed in claim 28, further comprising the steps of:

generating a bookmark associated with the first content if the first selection is received;

storing a transition entry comprising a transition in a history stack before transitioning; and storing the bookmark prior to the step of transitioning and associating the bookmark with the transition entry in the history stack.

32. The method as claimed in claim 31, further comprising the steps of:

receiving a second selection;

referencing the history stack and the bookmark; and transitioning back to the first content according to the history stack and the bookmark.

33. The method as claimed in claim 28, further comprising:

identifying the first content; and authenticating the first content, wherein the step of transitioning occurs when the first content is authenticated.

34. A method for providing access to content, comprising:

providing access to a first content in a first view;

receiving a request to access a second view while viewing the first content in the first view;

switching to the second view and providing access to a second content in the second view;

recording a transition command in a first history of the first view; and recording a first bookmark and associating the first bookmark with the switch command.

35. The method as claimed in claim 34, wherein the switching to the second view further comprises:

retrieving a second history associated with the second view; and wherein the providing access to the second content comprises providing access to the second content in the second view according to the second history.

36. The method as claimed in claim 34, further comprising:

receiving a request to switch back to the first view while in the second view;

switching to the first view;

recording a second transition command in the second history;

recording a second bookmark;

associating the second bookmark with the second transition;

retrieving the first history and the first bookmark; and providing access to the first content in the first view according to the first history and the first bookmark.

37. The method as claimed in claim 34, further comprising:

receiving a request to view a third content with the first content in the first view;

providing access to the third content with the first content in the first view; and recording a third transition command in the first history.

38. The method as claimed in claim 37, further comprising:

recording a third bookmark; and associating the third bookmark with the third transition command in the first history.

\* \* \* \* \*